US007559080B2

(12) United States Patent
Bhargavan et al.

(10) Patent No.: US 7,559,080 B2
(45) Date of Patent: Jul. 7, 2009

(54) AUTOMATICALLY GENERATING SECURITY POLICIES FOR WEB SERVICES

(75) Inventors: Karthikeyan Bhargavan, Cambridge (GB); Cedric Fournet, Cambridge (GB); Andrew Donald Gordon, Cambridge (GB); Christopher G. Kaler, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 763 days.

(21) Appl. No.: 11/025,375

(22) Filed: Dec. 29, 2004

(65) Prior Publication Data

US 2005/0251853 A1    Nov. 10, 2005

Related U.S. Application Data

(60) Provisional application No. 60/568,138, filed on May 4, 2004.

(51) Int. Cl.
*G06F 21/00* (2006.01)
(52) U.S. Cl. .............................. 726/1; 713/151; 713/168
(58) Field of Classification Search ..................... 726/1; 713/151, 152, 160, 168, 169, 180, 181
See application file for complete search history.

(56) References Cited

U.S. PATENT DOCUMENTS

| 2003/0014644 | A1* | 1/2003 | Burns et al. | .................. | 713/182 |
| 2004/0054912 | A1* | 3/2004 | Adent et al. | ................ | 713/181 |
| 2005/0268326 | A1* | 12/2005 | Bhargavan et al. | ............. | 726/1 |

OTHER PUBLICATIONS

Pucella et al., "TulaFale: A security Tool for Web Services", Appears in Proceedings of the 2nd International Symposium on Formal Methods for Components and Objects (FMCS'03), LNCS 3188, pp. 197-222, Springer-Verlag Berlin Heidelberg, Mar. 2004, http://securing.ws.*

K. Bhargavan, C. Fournet, and A. D. Gordon. A semantics for Web services authentication. In 31st ACM Symposium on Principles of Programming Languages (POPL'04), pp. 198-209, 2004. An extended version appears as Microsoft Research Technical Report MSR-TR-2003-83.

B. Blanchet. An efficient cryptographic protocol verifier based on Prolog rules. In Proceedings of the 14th IEEE Computer Security Foundations Workshop, pp. 82-96. IEEE Computer Society Press, 2001.

B. Blanchet. From secrecy to authenticity in security protocols. In Proceedings of the 3th International Static Analysis Symposium (SAS'02), vol. 2477 of Lecture Notes in Computer Science, pp. 342-359. Springer-Verlag, 2002.

(Continued)

*Primary Examiner*—Gilberto Barron, Jr.
*Assistant Examiner*—Hadi Armouche

(57) ABSTRACT

Systems and methods for automatically generating security policy for a web service are described. In one aspect, one or more links between one or more endpoints are described with an abstract link description. The abstract link description describes, for each link of the one or more links, one or more security goals associated with exchange of message(s) between the one or more endpoints associated with the link. The one or more endpoints host respective principals networked in a distributed operating environment. Detailed security policies for enforcement during exchange of messages between the one or more endpoints are automatically generated from the abstract link description.

18 Claims, 6 Drawing Sheets

OTHER PUBLICATIONS

D. Box, F. Curbera, M. Hondo, C. Kaler, D. Langworthy, A. Nadalin, N. Nagaratnam, M. Nottingham, C. von Riegen, and J. Shewchuk. Web services policy framework (WS-Policy). May 2003.

D. Box, M. Hondo, C. Kaler, H. Maruyama, A. Nadalin, N. Nagaratnam, P. Patrick, C. von Riegen, and J. Shewchuk. Web services policy assertions language (WS-PolicyAssertions), May 2003.

G. Della-Libera, P. Hallam-Baker, M. Hondo, T. Janczuk, C. Kaler, H. Maruyama, N. Nagaratnam, A. Nash, R. Philpott, H. Prafullchandra, J. Shewchuk, E. Waingold, and R. Zolfonoon. Web services security policy language (WS-SecurityPolicy). Dec. 2002.

* cited by examiner

400

500

AUTOMATICALLY GENERATING SECURITY POLICIES FOR WEB SERVICES

RELATED APPLICATION

This application claims priority to U.S. provisional patent application filed on May 4, 2004, titled "Checking the Security of Web Services Configurations", Ser. No. 60/568,138, hereby incorporated by reference.

TECHNICAL FIELD

Systems and methods of the invention relate to distributed systems security.

BACKGROUND

Existing protocol verifiers work on ad-hoc, hand-written, abstract descriptions of security protocols. The gap between the hand-written description and the running code can lead to errors. To make matters worse, to check and to maintain the hand written description is substantially labor intensive and time consuming.

SUMMARY

Systems and methods for automatically generating security policy for a web service are described. In one aspect, one or more links between one or more endpoints are described with an abstract link description. The abstract link description describes, for each link of the one or more links, one or more security goals associated with exchange of message(s) between the one or more endpoints associated with the link. The one or more endpoints host respective principals networked in a distributed operating environment. Detailed security policies for enforcement during exchange of messages between the one or more endpoints are automatically generated from the abstract link description.

BRIEF DESCRIPTION OF THE DRAWINGS

In the figures, the left-most digit of a component reference number identifies the particular figure in which the component first appears.

DETAILED DESCRIPTION

Overview

Figure 1:
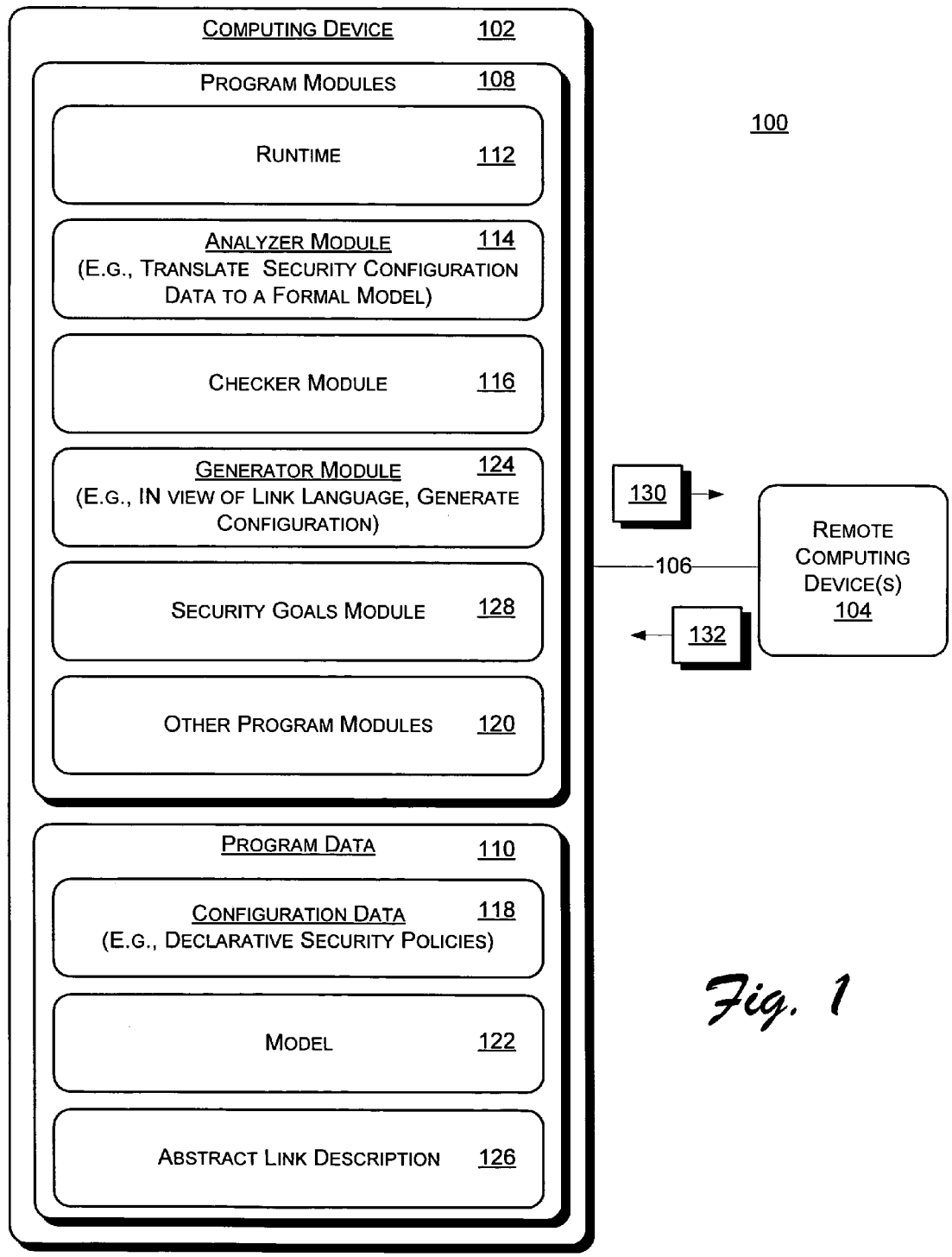
FIG. 1 illustrates an exemplary computing device for automatically generating security policies for web services and checking the security of a Web service configuration.

SOAP messages sent over insecure transports can be protected via embedded security headers; the WS-Security specification defines how such headers may include cryptographic materials, such as signatures or ciphertexts, and a range of security tokens, such as tokens identifying particular principals. Relying on their generic implementation in libraries, web service developers can select headers and tokens for their messages, according to their security goals, thereby designing their own application-level protocols on top of SOAP-based standards.

Like all networked systems secured via cryptography, web services using WS-Security may be vulnerable to a class of attacks, where an attacker may intercept, compute, and inject messages, but without compromising the underlying cryptographic algorithms. In the setting of SOAP security, such attacks are referred to as Extended Markup Language (XML) rewriting attacks, as opposed to attacks on web services implementations, such as buffer overruns, SQL injection, and so on.

In the Web Services Enhancements (WSE) 2.0 implementation of WS-Security (and perhaps others), processing of security headers can be programmed via declarative configuration files separate from imperative code (code directly compiled to run within a runtime). WSE 2.0 generates outgoing security headers and checks incoming security headers according to XML metadata files conforming to the WS-SecurityPolicy specification. This follows a principle stating that when building secure systems, isolate security checks from other aspects of message processing to aid human review of security. Still, such a system is substantially problematic. For instance, WS-SecurityPolicy is a low-level (very detailed) language for building and checking individual security headers. There is no direct way to use such a low-level language to relate policies to high-level goals such as message authentication or secrecy. Another problem with existing systems is related to the use of a configuration file (e.g., WS-SecurityPolicy files of a SOAP-based system), which largely determine an entity's vulnerability to XML rewriting attacks. A programmer has almost complete freedom to modify the configuration file with other and new invented cryptographic protocols. These protocols are hard to get right, in whatever guise. This means that modifications to a runtime configuration file can undermine any security goals that may have been desired.

The systems and methods described herein, propose a new language and new tools to address these problems. For instance, the following description presents a high-level (abstract) link description language for describing intended secrecy and authentication goals for messages flowing between SOAP processors. The link language is a simple notation covering common cases of message flows that can be generated, for example, from a user interface (or wizard) and/or a systems modeling tool. The systems and methods to check security of web services configurations utilize a "Generator" computing module (described below in reference to FIG. 1) to compile link descriptions to configuration files/data. In part because of the subtle semantics of a configuration file, it is significantly safer and less error prone to automatically generate a configuration file from an abstract link description than to write a configuration file directly. For purposes of description and exemplary implementation, a configuration file is often referred to as a WS-Security Policy file, although the configuration file is not limited to such a data format or to an environment that implements WS-Security Policy.

Additionally, the systems and methods to check security of web services configurations utilize an "Analyzer" computing module to check, prior to execution, whether the security goals of a link description are achieved in a given WS implementation. In this implementation, the Analyzer takes as input a collection of configuration files, for example, WS-SecurityPolicy file(s), and an abstract link description. The Analyzer constructs a model for this configuration as a set of SOAP processors, together with the security checks the processors perform. The model also includes a formal specification of the security goals stated in the link description. In one implementation, and for purposes of example and illustration, such a model is expressed in the TulaFale scripting language, a dialect of the pi calculus developed to express such distributed implementations. In this implementation, existing tools for TulaFale are then executed to check automatically whether the security goals of the model are vulnerable to any XML rewriting attacks.

In view of the above, the systems and methods to check security of web services configurations provide formal semantics to automatic analysis of abstract descriptions of cryptographic protocols for WS security. Having tools automatically construct a model (e.g., a TulaFale model) for analysis substantially eliminates any human error arising from constructing models by hand, and further allows for systematic verification of configuration files used to deploy web services. These systems and methods ensure substantially strong end-to-end security between applications by composing and supporting robust declarative security policies. That is, given two applications, or just their security setting, a static analysis can be made using the above tools. As well, a dynamic analysis can also be applied by using the above tools at runtime. For instance, prior to accessing another service, the data for that service can be obtained and then analyzed to determine if safe communication is possible, based on their security settings.

An Exemplary System for Automatic Checking of Security Goals

FIG. 1 shows an exemplary system 100 for automatically generating security policies for web services and checking the security of a Web service configuration. In this implementation, the security goals are written by a human being, although in other implementations, the security goals may be derived from other sources, for example, automatically generated. System 100 includes computing device 102 coupled to one or more remote computing device(s) 104 over network 106. Computing device 102 includes computer-program modules 108 and program data 110. The computer-program modules include, for example, a runtime program module 112, an analyzer program module 114, and a checker program module 116.

Runtime 112 (e.g., a NET runtime) provides a runtime environment that may be distributed across multiple machines such as across one or more remote computing devices 104. In this implementation, runtime 112 uses cryptographic security protocols for communications based at least in part on configuration data 118, or scripts. Runtime 112 interfaces with other software components including, for example, an operating system, Internet Information Services (IIS), and WSE libraries. For purposes of illustration such other software components are respectively represented as portions of "other program modules" 120.

Configuration data 118 includes, for example, information on system 100 deployment such as addresses and local configurations for computing devices (machines) of system 100 and their relations. Such information may determine processing of cryptographic materials, such as operations to encrypt, decrypt, compute a signature, verify a signature, generate key material or fresh nonces, check identities or nonces in messages, choose from a suite of cryptographic algorithms, and to process a range of security tokens, for instance, in a WS-Security data format. In this implementation, for example, configuration data 118 is a description of a set of SOAP endpoints, each associated with a collection of policy description (i.e., declarative security policies) in terms of the WS-SecurityPolicy language (a particular case of the WS-Policy language). The PolicyLanguage data is XML files in the WS-SecurityPolicy language, although other markup of security policy languages could also be used.

Analyzer 114 and checker 116 in combination provide a formal tool for checking configuration data 118 to verify (or enforce) its secure execution. Analyzer 114 translates at least a portion of configuration data 118 into model 122. In this implementation, the model is expressed in a ProcessModel language. ProcessModel includes logical predicates expressing filtering and processing of messages. In this implementation, the ProcessModel data are pi-calculus processes in the TulaFale syntax, although other syntax could be used. For instance, Analyzer 114 translates a PolicyLanguage into logical Predicates used as an input to checker 116 (PolicySemantics: PolicyLanguage->Predicates). In this implementation, the Predicates are clauses defining logical predicates in the TulaFale syntax (that is, Prolog-style predicates on XML data with a symbolic representation of cryptography).

Checker 116 is an automatic or semi-automatic tool for checking/evaluating properties of ProcessModels, which are expressed, for example, in a SecurityAssertions language. Examples of properties expressible in the SecurityAssertions language include confidentiality properties for some information exchanged between machines, and authenticity properties expressed as correspondences between the local actions performed by these machines. SecurityAssertions may also express security properties related to privacy (such as identity or data protection) or quality of service. In this implementation, the SecurityAssertions language includes TulaFale assertions of authentication (via formal correspondences) or secrecy properties, although other representations of the assertions could also be utilized.

An exemplary process utilizes system 100 in view of configuration C (configuration data 118) of runtime 112 and relatively short SecurityAssertions A generated by a human. Checker 116 evaluates output from analyzer 114, which processes configuration C in view of assertions A. Checker 116 outputs a result indicating either okay, (meaning the assertions are satisfied), or counterexample (which uses investigation, and may indicate a security vulnerability in C), or don't know (which includes the checker failing to terminate, and which again specifies investigation).

In view of the above, configuration data 118, which is directly executed by runtime 112, is also processed by analyzer 114 and checker 116 to directly determine whether the execution of runtime 112 may be vulnerable to attack. This is in contrast to conventional systems, wherein protocol-verifiers work on ad-hoc, hand-written, abstract descriptions of security protocols, and the gap between the hand-written description and the running code can lead to errors, and is tedious to check and to maintain. In other words, analyzer 114 to systematically link runtime 112 and checker 116 is novel.

Alternate implementations of system 100 include, for example, runtime 112 may be any policy-driven implementation of cryptographic protocols using WS-Security, and not use XML or any markup at all. Configuration data 118 may include ProcessModel itself, or some mixture, which may be directly executed in some implementations. For example, one could extend WSE to support declarative configurations specified in a mixture of TulaFale and WS-SecurityPolicy. Moreover, after using analyzer 114 to obtain ProcessModel, one can apply a large range of techniques and tools in addition to checker 116.

This implementation of checker 116 uses a TulaFale tool plus ProVerif, a resolution-based theorem prover. In a different implementation, a different theorem prover (e.g., TAPS) are applied, plus also model-checkers, type-checkers, etc. Other useful techniques include, for instance, model-based testing of the implementation of the system and model-based monitoring or filtering of its runtime behaviour. Analyzer 114 and checker 116 can be refined to operate on partial configurations, describing for example the policies for some, but not all machines in a system. This refinement is useful to check that some security properties hold independently of some machines whose local configuration is unknown or untrusted.

Automatic Generation of Security Policies for Web Services

FIG. 1 also shows an exemplary system 100 for automatically generating security policies for web services. In this implementation, computing device 102 further includes generator (Generator) module 124, which generates configuration file 118 from link language 126, and security goals (SecurityGoals) module 128, which maps link language 126 (link descriptions) to correspondences (for authentication) and secrecy assertions that may be embedded in model 122 (e.g., in one implementation, these aspects are embedded in TulaFale scripts). The output of the security goals module for embedding in model 122 is a respective portion of program data 110. More particularly, output of the security goals module is a series of correspondences and secrecy assertions. Correspondences indicate a set of data that a receiver of a message can agree upon with the sender of the message; such data may include the identities of the receiver and of the sender, the contents of the message, headers of the message such as timestamps, message identifiers, and routing information, and the relationship of this message to any previous messages in the conversation. Secrecy assertions indicate that certain data (including cryptographic key material) is kept secret from the attacker.

The LinkLanguage is a simple language of secure links between endpoints (e.g., see paragraph [0084]). Generator 124 maps these links to WS-SecurityPolicy. More particularly, LinkLanguage 1160 ("L") is an abstract, or high-level format for describing secure links between SOAP endpoints, typically between sets of principals acting as clients and servers. For each link, the format describes the intended goals of the link, which may include message authentication, confidentiality, anonymity, correlation of request and reply, trust relationship between principals, replay or DOS protection, and so on, and may also concern some implementation details, such as the intended authentication mechanism (e.g., shared password, public-key signatures, Kerberos tokens, WS-SecureConversation tokens etc). In addition, the format describes the composition of links to form high-level application configurations.

An exemplary link description (LinkLanguage) 126 is shown below in paragraph [0082]. LinkLanguage 126 is considerably more abstract (e.g., less expressive) than configuration data 118, so that reviewing the security of a LinkLanguage description is much easier than understanding the security implications of every detail in configuration data 118. For instance, LinkLanguage 126 and generator 124 can be designed so that any generated configuration avoids common patterns of errors otherwise expressible in hand-written configurations, thereby providing "secure by default" configurations for runtime 112.

Given such an input L, configuration C=Generator(L) is intended to drive runtime 112 to achieve the intended security properties for all links in L. Moreover, the SecurityAssertions A=SecurityGoals(L) are a formal representation of the intended security properties, suitable for automatic checking. A first exemplary usage is that, for any link description L, we can check that Generator 124 is producing a secure policy, by running Checker 116 (Analyzer(Generator(L)),SecurityGoals(L)), which should return ok, or a counterexample. This check could be either during conventional test runs of the Generator function 124, for a fixed or randomly generated set of inputs L, or during actual deployment of the Generator 124, so that every time it is run to produce a configuration C=Generator(L), we check the security of C before passing it to runtime 112.

A second exemplary usage is that, given a link description L, describing an intended link, and a configuration C consisting of pre-existing or hand-written policies, we can check whether C meets the goals of L by running Checker(Analyzer (C), SecurityGoals(L)).

A third exemplary usage is that given a link description L, and a configuration C that is obtained by editing Generator (L), perhaps after installation, we can check that security has been maintained by running Checker(Analyzer(C), SecurityGoals(L)).

These usages can also be combined, in case the generator produces only some part of the configuration, while the rest of the configuration is left unchanged. The security goals can be tested by running Checker(Analyzer(C+Generator(L)),SecurityGoals(L)).

In one implementation, checker 116 runs in conjunction with a theorem proving and/or type-checking application. In such an implementation, checker operations are facilitated with one or more additional hints, such as for example type annotations. For example, type annotations may be expressed using various type and effect systems and dependent type systems for cryptographic protocols (such as those produced within the MSR/DePaul University Cryptyc Project). A variation is to introduce a helper function to be run in conjunction with generator 124. For purposes of illustration, such a helper function is shown as a respective portion of other program module(s) 636 of FIG. 6. For example:

Helper (not shown in FIG. 1): LinkLanguage -> Hints
SemiAutomaticChecker (not shown in FIG. 1):
ProcessModel, SecurityAssertions, Hints -> ok, or counterexample, or don't know In one implementation, the helper function runs in conjunction with the Generator, and in another implementation, the helper function is implemented by the Generator. In either implementation, the helper function constructs hints appropriate to the configurations produced, such as, for example, the intended types for key material. To test C=Generator(L) against A=SecurityGoals(L), we would run SemiAutomaticChecker(Analyzer(C),A,Helper(L)), much as automatic testing before. We have not implemented this semi-automated variation.

Security Policies for Web Services

Web Services and their Configuration

For purposes of exemplary illustration, this implementation of system 100 considers SOAP processors distributed across multiple machines (e.g., computing devices 102 and 104). Each processor may send and receive SOAP envelopes 130 and 132 for various services. The envelope format is processed by generic system libraries, driven by some declarative configuration files, whereas the envelope payload is processed by imperative application code. A simple (unprotected) envelope, for example, may be of the form

```
<Envelope>
   <Header>
      <To>h_t_t_p_:_/_/_bobspetshop.com/service.asmx</To>
      <Action>http://petshop/premium</Action>
      <MessageId>uuid:5ba86b04...</MessageId>
   </Header>
   <Body><GetOrder><orderId>20</orderId></GetOrder></Body>
</Envelope>
```

This envelope has a message body, representing a method call at the service, preceded with optional headers that provide the URIs of the target service and action and a unique message identifier. In the above example, to return the result of GetOrder (20), the service may use an envelope with header <RelatesTo>uuid:5ba86b04 . . . </RelatesTo> to route the response to the requester.

SOAP envelopes can be protected using an additional security header gathering adequate security tokens. For instance, message integrity may be protected by a signature token embedding a XML digital signature, whereas the identity of the sender may be passed as a second token embedding an X.509 certificate. Parts of the envelope may also be encrypted, possibly using a third token to indicate how to derive the decryption key. Compared to traditional transport protocols, this approach emphasizes flexibility, at a cost in terms of performance and complexity. Indeed, WS-Security provides a precise grammar and default processing for security tokens, but does not prescribe a particular protocol.

Rather than using application program interfaces (APIs) for manipulating security tokens, application writers are encouraged to state their security requirements in an abstract link language 126 for automatic conversion by generator module 124 to a detailed set of security policies in a configuration data file 118. In this implementation, system 100 is configured by stating, for instance, the services and actions supported by a given server, and the trust relationship between client and servers (e.g., 102 and 104 or vice versa). As a result, configuration data 118 may entirely determine processing of cryptographic materials, such as operations to encrypt, decrypt, compute a signature, verify a signature, generate key material or fresh nonces, check identities or nonces in messages, choose cryptographic algorithms, and to process a range of security tokens in the WS-Security format. (A nonce is a random or non-repeating value that is included in data exchanged by a protocol, usually for the purpose of guaranteeing liveness and thus detecting and protecting against replay attacks.)

For purposes of exemplary illustration, system 100 implements Web services, WSE 2.0, running on top of the .NET runtime, although other Web service and runtime combinations could also be used. To check that tools consume and produce the same XML envelopes and configuration files as WSE 2.0, the following description captures its security semantics for purposes of example. This approach can be adapted to other systems relying on such exemplary specifications.

WS-Policy and WS-SecurityPolicy

A series of Web Security standards, for example, WS-Policy [5], WS-PolicyAssertion [6], and WS-SecurityPolicy [7], allow for declaration with respect to a client side and a Web Service side, which security tokens to embed on sent messages, and which security tokens to check on received messages. Despite their name, policies are typically not very abstract: they state mechanisms to encrypt and sign elements of envelopes, rather than confidentiality or authentication goals. WS-Policy structures policy files as logical formulas over base assertions that can be composed using operators for conjunction, All[ . . . ], and disjunction, OneOrMore[ . . . ]. In this implementation, other features of WS-Policy seldom used for security, such as the Exactlyone[ . . . ] operator and the Rejected and Optional modifiers are not used.

WS-SecurityPolicy defines two base assertions for integrity and confidentiality. Each assertion refers to a key, either from an X.509 certificate or derived from a shared secret associated with the client. In SOAP envelopes, this is implemented by embedding either an X.509 token or a username token in the security header. Although the actual key is provided at runtime from a local database, the assertion may specifically request a subject name. Each assertion is also parameterized by a list of parts, denoting target elements of the envelope to be encrypted or jointly signed. Each part may be specified by its header name, or more generally using an XPATH expression. For each integrity assertion, a XML digital signature token is embedded in the security header. For each encrypted part, the target element is replaced with its encryption.

On the receiver side, a SOAP envelope is accepted as valid, and passed to the application, if its policy is satisfied for this envelope. Conversely, on the sender side, the protocol stack generates SOAP envelopes that satisfy its policy. In one implementation, and for functional correctness, the sender policy is at least as demanding as the receiver policy. This may be enforced by exchanging and comparing policies beforehand, using auxiliary protocols.

Next, we define an abstract syntax for policies. In this description, we omit the explicit choice of algorithms for canonicalization, secure hash, shared-key encryption, and we assume a fixed, evident algorithm for each purpose. (Conversely, our tools consume and produce the concrete XML syntax for policies defined in web services specifications and used by WSE 2.0.)

| Policies | |
|---|---|
| tk:Token ::= | Token Descriptions |
| X509 | X.509 Token, any subject |
| X509(sub :string) | X.509 Token with subject sub |
| Username | User/Password Token, any user |
| Username(u :string) | User/Password Token with user u |
| part:Part ::= | Message Parts |
| Header(tag :string) | SOAP Header with tag tag |
| Body | SOAP Body |
| pol:Pol ::= | Policies |
| None | Empty policy, Always true |
| All(ps :List(Pol)) | Conjunction of list of policies |
| OneOrMore(ps :List(Pol)) | Disjunction of list of policies |
| Integrity(tk :Token,pts :List(Part)) | Integrity assertion |
| Confidentiality(tk :Token,pts :List(Part)) | Confidentiality assertion |

As an example, the following policy may be used to secure the exemplary SOAP envelope shown above, by encrypting its message body using the service's X.509 public encryption key, and by signing all its elements using a shared secret associated with the client.

```
All [ Integrity(Username,
    [ Header("To"),Header("Action"),Header("MessageId"),Body ]),
    Confidentiality(X509("BobsPetShop"),[Body]) ]
```

Policy Maps (e.g., in WSE 2.0)

Since a SOAP processor may host (and interact with) many services with diverse security requirements, how policies are associated with services and envelopes are specified. In WSE 2.0, this is expressed in a local configuration file used for dispatching SOAP envelopes sent over HTTP, which gives two (XML) partial maps from SOAP endpoints to individual policies, for incoming and outgoing envelopes, respectively. (For HTTP servers, this is the Web.config file in the same IIS virtual directory as the service; for clients, this is an app.config file in the same local directory as the application code.) In this description, we use an abstract syntax for policy configurations:

```
                        Configurations
uri:URI ::=  anyLegalXmlUri   Set of URIs
addr :Addr ::=         SOAP Endpoint Addresses
    Default             Default service and action
    ToDefault(suri :URI)       Default action at service suri
    ToAction(suri :URI,ac :URI)   Action ac at service suri
map :Polmap ::=        Policy Maps
    Send(addr :Addr,pol :Pol)     Send Policy for addr
    Receive(addr :Addr,pol :Pol)   Receive Policy at addr
cfg :Config ::=        Configurations
    polmaps :List(Polmap)      List of policy maps
```

As an example, a configuration for the client is provided that supports the request and response given above. The client sends requests and receive responses:

```
clientConfig =
    [ Send(ToAction("http://bobspetshop.com/service.asmx",
            "http://petshop/premium"),
        Integrity(Username,
            [Header("To"),Header("Action"),
            Header("MessageId"),Header("Created"),Body])),
    Receive(Default,
        Integrity(X509("BobsPetShop"),
            [Header("From"),Header("RelatesTo"),
            Header("MessageId"),Header("Created"),Body])) ]
```

Tools for Analyzing Policies: Architecture

In one implementation, a general approach to check security of web services configuration is depicted in FIG. 1. As shown, this exemplary approach develops an operational model for Web services that (1) closely reflects their actual deployments and (2) supports automated verification of security properties. Instead of actually running Web services applications using WSE 2.0, we symbolically verify their security using TulaFale, a scripting language for expressing XML security protocols.

Figure 2:
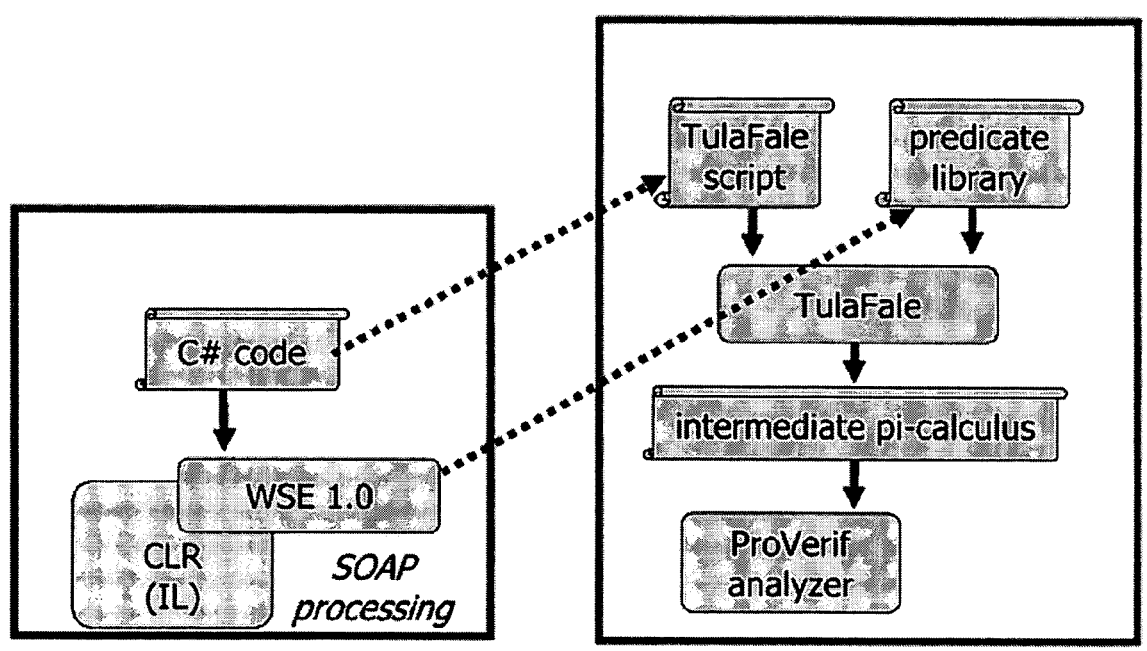
FIG. 2 illustrates an exemplary dataflow when analyzing a system description to check the security of a Web service configuration.

FIG. 2 shows an exemplary dataflow when analyzing a system description written as a TulaFale script. Some scrolls represent scripts, either hand-written or compiled from other scripts, and the other oblong scrolls show tools that either compile one script into another, or analyze a script. The ProVerif tool is a third-party software that analyzes security protocols expressed in an intermediate pi calculus. The TulaFale tool performs type-checking of its input script, and then compiles it into the intermediate pi-calculus, for analysis by ProVerif.

TulaFale, a Security Tool for Web Services (Review)

Tulafale [2] is a typed language based on the applied pi calculus with support for XML processing, built on top of ProVerif [3, 4], a cryptographic protocol verifier. The language has terms, predicates, and processes. Terms combine XML and symbolic "black-box" cryptography, parameterized by a set of rewrite rules. For instance, we define AES symmetric encryption and decryption in TulaFale as follows:

```
constructor AES(bytes,bytes):bytes.
destructor decryptAES(bytes,bytes):bytes with decryptAES(k,AES(k,b)) =
b.
```

Prolog-style predicates operate on terms; they are used to reflect the syntax and informal semantics of Web Services specifications. For instance, the following predicate (used in Appendix A) gives a formal account of WS-Security username tokens, by describing how to build this XML token and compute a derived key from username u, secret pwd, timestamp t, and nonce n:

```
predicate mkUserTokenKey (tok:item,u,pwd,t:string,n:bytes,k:bytes) :-
    tok =  <UsernameToken>
            <Username> u </>
            <Password Type="None"></>
            <Nonce> base64(n) </>
            <Created> t </> </>,
    k = pshal(pwd,concat(n,utf8(t))).
```

Processes express configurations of principals that send, receive, and transform terms using these predicates. Relying on scopes, they can also generate fresh names modeling secrets, nonces, and message identifiers.

The attacker ranges over arbitrary (process) contexts, and can thus attempt any active attack combining communications, cryptography, and XML rewriting. The only restriction is that fresh names are not initially available to the attacker.

Formal security properties are also expressible in TulaFale. We compile the script then invoke ProVerif, a resolution-based protocol verifier. For each property, either ProVerif succeeds, and establishes the property for all runs, in any context, or it fails with a trace that we can (usually) decompile into a Tulafale run, or it diverges. Properties include confidentiality (some name remains secret for all runs) and authenticity (expressed as correspondences between special events performed by processes to mark their progress). Since TulaFale scripts define processes, the general theory of the pi calculus can also be usefully applied, for instance to prove complementary properties by hand, or to generalize automatically-proved properties.

Generating TulaFale Scripts from Policy Configurations

To facilitate the verification of declarative SOAP configurations, we first extend our framework with a tool that compiles these configurations to TulaFale scripts, thereby giving precise operational semantics to their specifications. The core of our "configuration compiler" (e.g., generator module 124 of FIG. 1) includes a translation from WS-SecurityPolicy formulas to TulaFale predicates on envelopes configured to operate with respect to the exemplary model based on WS-Security. Pragmatically, our tool can also collect the policy maps of a WSE 2.0 implementation and automatically generate its TulaFale script. From that point, one can hand-write relatively short security properties for the configuration and verify them using TulaFale. More superficially, the tool can also detect and report common errors in policy configurations (often apparent in TulaFale), such as unauthenticated routing information.

Our tools and the actual Web service runtime take as input the same policy configurations. Hence, we can directly determine whether the Web service will be vulnerable to attack. In contrast, in previous work, a protocol verifier works on adhoc, hand-written, abstract descriptions of security protocols, and the gap between the hand-written description and the running code can lead to errors, and is tedious to check and to maintain. In other words, many formal techniques for verifying cryptographic protocols are now available, but their systematic application to reflect actual distributed deployment of these protocols is new.

Generating Security Goals and Policies for Abstract Configurations

In the absence of a specification for expressing high-level security goals, link descriptions 126 use a simple format to describe secure links between SOAP endpoints hosting sets of principals acting as clients and servers. This format can mention a few basic security properties, such as message authentication, to ensure that links are much easier and safer to configure than policy maps. From a link description, we provide tools that generate both a TulaFale representation of the intended security properties, suitable for automatic checking, and WSE configurations that meet these properties.

The language of link description 126 is abstract and less expressive than policy maps, so that reviewing the security of a link description is much easier than understanding the security implications of every detail in a configuration. For instance, they can be designed so that automatically-generated configurations avoid common pitfalls, and thereby provide "secure by default" Web services configurations.

For any link description, we can combine multiple tools and check that associated policies in the configuration data 118 are actually correct by converting them into a model 122 (e.g., expressed in TulaFale, or in another manner), and running the checker 116 (verifier). A different (or a modified) configuration can also be used, for instance by hand-writing some of the policies, and checking that the amended configuration still meets the original security goals. In this implementation, we automatically verify formal security guarantees, without the use to manually manipulate TulaFale scripts. For instance, one could verify goals after modifying a running configuration.

Figure 3:
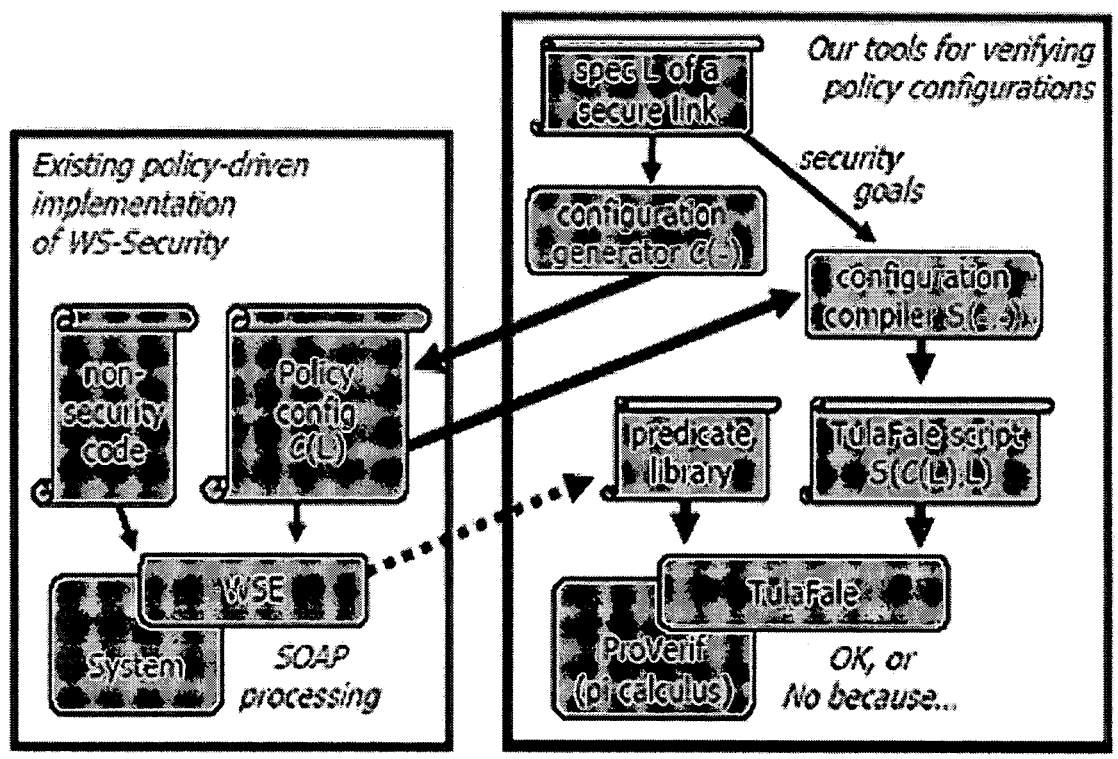
FIG. 3 illustrates an exemplary dataflow for configuration data file generation and security policy analysis to check the security of a Web service configuration.

FIG. 3 illustrates an exemplary dataflow for crypto-configuration data file generation and security policy analysis to check the security of a Web service configuration. First, note that a model, seen as an exemplary "reference implementation" (on the right), follows the modular structure of a target system (on the left). Indeed, the modeling of WS-Security, for example, was developed and thoroughly tested independently of higher-level specifications, by checking that TulaFale envelopes correspond to those experimentally observed with WSE for a series of examples, and by comparing the dynamic checks on security tokens performed in TulaFale and in WSE. In a second stage, the compilation of policies is validated. The compilation of policies is also checked to ensure that generated policies were accepted by WSE 2.0 and yield the expected SOAP envelopes. Independently, the tools check (rather than assume) the correctness of policy generation.

In this implementation, the exemplary model for SOAP processors and attackers is somewhat arbitrary—we implemented several variants in TulaFale, by programming additional APIs providing additional capabilities for the attacker. Still, the described systems and methods do account for arbitrary XML rewriting attacks, and for unbounded numbers of principals hosted by SOAP processors, potentially reusing the same keys for different roles in parallel sessions for various services and actions. More particularly, and in one implementation, to verify declarative SOAP configurations, the framework is extended with a tool that compiles configurations to TulaFale scripts, thereby giving a precise operational semantics to their specifications. The "configuration compiler" implements a translation from WS-SecurityPolicy formulas to TulaFale predicates on envelopes based on WS-Security. The tool also collects the policy maps of a WSE implementation and automatically generates its TulaFale script. From that point, one can hand-write relatively short security properties for the configuration and verify them using TulaFale.

System 100 can also detect and report common errors in policy configurations (often apparent in TulaFale), such as unauthenticated routing information. The tools and the actual web service runtime take as input the same policy configurations. Hence, the systems and methods can directly determine web services vulnerabilities caused by mis-configuration of configuration data policy files. In contrast, in previous work, protocol verifiers work on ad hoc, hand-written, abstract descriptions of security protocols, and the gap between the hand-written description and the running code can lead to errors, and is tedious to check and to maintain. In view of the above, the described systems and methods for checking the security of Web service configurations verify cryptographic protocols in their application to reflect actual distributed deployment of these protocols.

Policy Analysis: Implementation

Principals Using SOAP Processors

The following description first provides an informal overview of model 122, then details exemplary model coding in Tulafale, our variant of the pi calculus. Our system includes SOAP processors running on machines connected by a public network. See, for example, the system 100, wherein trusted and untrusted (controlled by the attacker) processors may be implemented. Processors send and receive SOAP envelopes on behalf of principals. In one implementation, principals provide code describing which envelopes to send and what to do with received envelopes. For simplicity, principals are identified by their (string) names, as they appear in authentication tokens: subject names in X.509, and user names in UsernameTokens. Principals matter inasmuch as they control access to their associated secrets. This distributed system uses an abstract mechanism for distributing secrets to processors.

A single processor may host many principals (for example when it is sending envelopes signed by several principals); besides, numerous processors may host the same principal (for example to replicate a service). Hence, we use generic SOAP processors parameterized by:

Two declarative configurations for sending and receiving SOAP messages, representing a partial map from SOAP endpoints to policies.

A local database that records shared passwords and X.509 certificates and private keys for the host principals.

For instance, a SOAP envelope is accepted if the requirements expressed by the receive policy associated with its URI and action can be satisfied using some of the secrets recorded in the database. In one implementation, pi calculus provides a rich interface for the attacker: the environment controls the creation of principals, their corruption, and the generation of certificates and shared keys.

In the following, we distinguish a set of compliant principals, such that all the secrets they can access are used only by these SOAP processors. Of course, SOAP processing does not depend on the knowledge of compliant principals; this knowledge is used solely for specifying exemplary security properties. Once compliant principals are identified, their distribution among SOAP processors becomes formally irrelevant. Formally, we show that any such configuration is observationally equivalent to a configuration with a single processor hosting all compliant principals, that is, with global policy mappings and databases merging all local mappings and databases.

Modelling a Policy-Driven SOAP System

Exemplary model 122 scripts are shown in the appendices, as a library and a main TulaFale program; these exemplary scripts provide exemplary detailed formal semantics. Next, we explain important parts of these scripts, partly by example. The top-level structure of our SOAP configuration includes four replicated processes running in parallel: (UsernameGenerator( )|X509Generator( )|GenericSender( )|GenericReceiver( )).

Username Generator

The username generator takes a principal name u (from the attacker) on the genUPChan channel, and generates a new password "pwdu". The password and username form a new entry added to the secrets database, as a replicated output on dbChan. Thus, this entry becomes available to any honest processor sharing dbChan.

```
process UsernameGenerator( ) =
  (!in genUPChan (u);
    new pwdu;
    let entry = <UserPassword><Username>u</><Password>pwdu</></>
    in
    (!out dbChan entry))
  | (!in genLeakUPChan (u);
    new pwdu;
    let entry = <UserPassword><Username>u</><Password>pwdu</></>
    in
    ((begin LogP (u); out publishChan (pwdu)) | (!out dbChan entry)))
```

To model untrusted principals with valid passwords, we add another replicated process to the username generator, with a similar structure. This process takes a principal name u on genLeakUPChan, generates a new password, leaks it to the attacker on the public channel publishChan, and inserts the username and password into the database. Before leaking the password, the process invokes begin LogP (u), indicating that the principal u can no longer be trusted. This event is invisible to all processes in the system; it is used purely for specifying our proof goals.

Similarly, X509Generator (defined in Appendix E) implements two servers on public channels genXChan and genLeakXChan relying on a single certification authority controling a secret signing key sr.

Generic Sender

For purposes of exemplary illustration, a SOAP sender and receiver is respectively represented by computing devices 102 and 104. The SOAP sender depends on its send policy configuration coded in the predicate mkConformant, and is otherwise generic. It takes an envelope from the attacker on the channel initChan, enforces the send policy configuration for the intended destination and generates a new policy-compliant envelope that is sent on httpChan.

The predicate mkConformant picks a send policy and attempts to enforce it for some set of principals by performing cryptographic operations on the input envelope. The set of principals and their associated secrets are represented by the list idents. This list is populated by extracting an adequate number of identities from the database. In addition, the predicate is given a list fresh of fresh names that may be used as fresh keys or nonces.

```
process GenericSender( ) =
  (!in initChan (env);
    in (dbChan,ident1); in (dbChan,ident2);
    let idents = [ident1 ident2] in
    new fresh1; new fresh2;
    let fresh = [fresh1 fresh2] in
    filter mkConformant(env,idents,fresh,outenv) -> outenv in
    out httpChan (outenv))
```

Generic Receiver

A SOAP receiver takes an envelope from the attacker on the channel httpChan, enforces the receive policy configuration for the intended destination and generates a proof that the envelope is acceptable. The predicate isConformant picks a receive policy and checks whether the envelope conforms to it for some set of principals by performing cryptographic operations. As for senders, the set of principals and their associated secrets are represented by the list idents, representing a subset of the database.

```
process GenericReceiver( ) =
  (!in (httpChan,env);
    in (dbChan,ident1); in (dbChan,ident2);
    let idents = [ident1 ident2] in
    filter isConformant(env,idents,proof) -> proof in
    done))
```

Semantics of Policies

The policy configuration 118 of the SOAP system 100 is coded as two predicates, mkConformant and isConformant. In particular, send policy maps are represented by clauses of mkConformant and receive policy maps are represented by clauses of isConformant. In this section, we specify the tool that generates these clauses from a given policy configuration. We present sample clauses generated from the client side configuration clientConfig in section 2, with one send and one receive policy. The send policy uses a digital signature of five message parts using a password-based key. This policy is translated from the link description 126, for example, into the following predicate (in configuration 118):

```
predicate hasSendPolicyClientToService(env:item,idents:items,
  fresh:items,outenv:item) :-
    fresh = [NewMessageIdval n t @ _],
    hasHeaderTo(env,Toitm,Toval),
    hasHeaderAction(env,Actionitm,Actionval),
    hasHeaderCreated(env,Createditm,Createdval),
    hasBody(env,bitm,bval),
    MessageIditm = <MessageId>NewMessageIdval</>,
    getUsernameToken(utok,k,idents,n,t),
  mkSignature(sig,"hmacsha1",k,[Toitm,Actionitm,MessageIditm,
    Createditm,bitm]),
    outenv = <Envelope>
      <Header>
        Toitm Acitm MessageIditm
        <Security>
          <Timestamp>Createditm <Expires></></>
          utok
          sig </></>
        <Body>bitm</>
      </>
```

The predicate first extracts three fresh names: the message id for the envelope, a nonce, and a timestamp for generating a password-based key. The next four hasXxx calls extract four of the five message parts that use to be signed. The predicate then creates a new <MessageId> element with the new message id. The predicate getUsernameToken extracts an arbitrary username and password from the idents database and generates a new username token utok and password-based key k using the fresh nonce and timestamp. The mkSignature predicate used the key k to construct an XML signature sig that signs all five message parts. Finally, the predicate constructs an output envelope outenv with all the input message parts, new message id, and the new username token and signature.

The hasSendPolicyClientToService enforces the client send policies described in respective configuration(s) 118. The corresponding send policy map is translated to a clause of the mkConformant predicate. This clause first matches the destination service and action of the message to the address in the policy map and then invokes the hasSendPolicyClientToService predicate.

```
predicate mkConformant(env:item,idents:items,
       fresh:items,outenv:item) :-
    hasHeaderTo(env,Toitm,Toval),
    hasHeaderAction(env,Actionitm,Actionval),
    Toval = "http://bobspetshop.com/service.asmx",
    Actionval = "http://petshop/regular",
    hasSendPolicyClientToService(env,idents,fresh,outenv).
```

The second policy in clientConfig 118 is a receive policy that checks that five message parts in the response message are signed with an X509 certificate issued to the principal BobsPetShop.

```
predicate hasReceivePolicyServiceToClient(env:item, idents:items,
  proof:items) :-
    hasHeaderFrom(env,Fromitm,Fromval),
    hasHeaderRelatesTo(env,RelatesToitm,RelatesToval),
    hasHeaderMessageId(env,MessageIditm,MessageIdval),
    hasHeaderCreated(env,Createditm,Createdval),
    hasBody(env,bitm,bval).
```

-continued

```
    hasSecurityHeader(env,toks),
    xtok in toks,
    checkX509Token(xtok,"BobsPetShop",xk,idents),
    sig in toks,
  isSignature(sig,"rsasha1",xk,[Fromitm,RelatesToitm,MessageIditm,
    Createditm,bitm]),
  proof = [<Integrity>
           <Token>xtok</>
           <Parts>Fromval RelatesToval MessageIdval Createdval bval</></>]
```

The corresponding receive policy map is translated to a clause of the isConformant predicate that simply invokes hasRecvPolicyServerToClient.

predicate isConformant (env:item, idents:items, proof: items):—hasRecvPolicyServerToClient(env,idents, proof).

Appendix C presents an exemplary general case, detailing exemplary rules for translating policy configurations to predicates. This is performed by Analyzer Module 114 of FIG. 1.

Generating Policy Configurations and Security Goals

Abstract Syntax of Link Specifications

A link defines the high-level security goals for SOAP sessions between a Web service and its clients. A link description 126 includes a set of links (for all the Web services of interest). A Web service is identified by its service URI, suri, and it offers a set of Web methods identified by their SOAP action URIs, actions.

For purposes of exemplary illustration, there are three different cases of SOAP sessions defined between a client and a Web service: In a first case, considered for most of this section, a session includes one message. Each link specifies two sessions, one for the request from client to service, and the other for the response from service to client. The link specifies that the messages in each direction are signed, is optionally encrypted, and that the signature must jointly authenticates the Web service, the message body, and a unique message identifier. For this case, the link specification defines at most one link for each service (suri). In particular, this means that all the actions of a service have the same security goals. If two Web methods use different security guarantees, they are implemented as separate Web services. This assumption is relaxed for other types of sessions.

In a second case, a session includes a request-response exchange. In this case, the link additionally specifies that the response is correctly correlated with the request. In a third case, a session is a secure multi-message conversation between client and server, such as one defined by the WS-SecureConversation specification.

Exemplary syntax of links is as follows; it uses the constructor List to refer to ML-style lists (a comma-separated sequence of elements enclosed within brackets).

Links

```
secr:Secr ::=       Secrecy Level
    Clear           Clear-text Message Body
    Encrypted       Encrypted Message Body
ps :PrincipalSet ::=  Sets of Principals
    Any             Set of all trusted principals
    pset : List(string)   Finite list of trusted principals
link :Link ::=      Links
    (suri :URI,     Server URI
    actions :List(URI),   List of Actions
    clientPrin :PrincipalSet,   Client Principals
```

```
servicePrin :PrincipalSet,    Server Principals
secrLevel :Secr)              Secrecy Level
```

In this implementation, each link (secure link) described in link description 126 includes the Web service URI, suri, the set of allowed actions, actions, the names of principals that can act as clients (clientPrin) or as the Web service (servicePrin), and the secrecy level of the messages in both directions. Recall that a principal name is the username in a User-Password combination or the subject-name in an X.509 certificate. As a special case, we interpret an empty list of client (or service) principals as allowing any principal to act as a client (or service) for the link. The secrecy level can either be Clear, meaning no encryption, or Encrypted, meaning that both requests and responses have encrypted bodies. For encryption, both the client and server principal must use X.509 certificates.

As an example, consider the following link:

```
SimpleLink = ("http://bobspetshop.com/service.asmx",
    ["http://petshop/premium"],
    Any,
    ["BobsPetShop"],
    Clear )
```

This link states that the Web service at http://bobspetshop.com/service.asmx, offers two actions http://petshop/premium and http://petshop/regular, that its clients can act on behalf of any trusted principal, and that the service acts only on behalf of BobsPetShop. Messages in both directions are authenticated, but encryption is not haved. In later section, we refer to the encrypted version of this link as EncLink.

Generating Policy Configurations from Link Specifications

We now describe a Generator function of module 124 to translate a list of links in link description 126 to a configuration 118 including a list of policy maps. We begin with the translation of the example given above: First, we define addresses (in addr notation) for each action of the Web service and for the clients:

```
addrPremium = ToAction("http://bobspetshop.com/service.asmx",
        "http://petshop/premium")
addrClient = Default
```

For request messages (130 or 132), a policy uses a digital signature of the message signed by some trusted principal. This signature guarantees message integrity and authenticity. This requestPolicy is as follows:

```
requestPolicy = OneOrMore[
    Integrity(Username,
        [Header("To"),Header("Action"),
        Header("MessageId"),Header("Created"),
        Body]),
    Integrity(X509,
        [Header("To"),Header("Action"),
        Header("MessageId"),Header("Created"),
        Body])]
```

The message content (Body), destination (To,Action), and identifier (MessageId,Created) is covered by a digital signature included in the message and based on either the password or the X509 certificate of some principal trusted by the service.

For response messages (130 or 132), the responsePolicy a digital signature based on an X509 certificate issued to BobsPetShop is used:

```
responsePolicy = Integrity(X509("BobsPetShop"),
        [Header("From"),Header("RelatesTo"),
        Header("MessageId"),Header("Created"),
        Body])
```

The response message includes the message identifier of the preceding request in its RelatesTo header. The destination of the response is implicitly the client that sent it this request message. The policy specifies that the service URI (From) and request id (RelatesTo) be covered by the digital signature along with the response identifier (MessageId,Created) and response content (Body).

The policy configuration 118 at the service includes the receive policies for requests and send policies for responses:

```
serverConfig = [Receive(addrPremium, requestPolicy),
    Send(addrClient, responsePolicy)]
```

In general, the service configuration 118 includes one receive policy for each (action, client principal, server principal) tuple, and a send configuration for each (client principal, server principal) pair. Conversely, at the client, the policy configuration 118 includes send policies for requests and receive policies for responses:

```
clientConfig = [Send(addrPremium, requestPolicy),
    Receive(addrClient, responsePolicy)]
SimpleConfig = serverConfig @ clientConfig
```

Appendix D shows exemplary rules to generate policy configurations.

Embedding Security Goals

A link of link description 126 specifies security goals for sessions between a client acting on behalf of one of the client principals and a Web service acting on behalf of one of the service principals. The authenticity goal is that a service principal only accepts request messages that have been sent by a client principal, and that a client principal only accepts response messages (for outstanding requests) sent by a service principal. In addition, if the link uses secrecy, then the bodies of the messages are kept secret from any principal not participating in the link. In this section, we formalize these security goals and show how they are embedded in a TulaFale script.

The Asserts function takes a link specification 126 and generates clauses for the hasLinkAssert and mkLinkEnvelope predicates that govern the authenticity and secrecy assertions. The Asserts function is generated by the Analyzer Module 114 of FIG. 1.

An envelope sent or accepted by an honest SOAP processor is a request or reply on some link L. For each such envelope, the hasLinkAssert computes an integrity assertion ("ass")

based on the direction of the message and envelope contents. Every time an honest SOAP processor sends out a message env, it first invokes an event begin Log(ass). Conversely, every time it accepts env, it then invokes end Log(ass). Our authenticity goal is that every end Log(ass) is preceded by a matching begin Log(ass).

For the example SimpleLink defined above, the generated clause is, for instance:

```
predicate hasLinkAssert(env:item,ass:items) :-
   hasHeaderTo(env,Toitm,Toval),
   hasHeaderAction(env,Actionitm,Actionval),
   Toval = "http://bobspetshop.com/service.asmx",
   Actionval = "http://premium",
   hasHeaderMessageId(env,MessageIditm,MessageIdval),
   hasHeaderCreated(env,Createditm,Createdval),
   hasBody(env,bitm,bval),
   ass = ["*" "BobsPetshop" Toval Actionval MessageIdval Createdval bval]
```

The first two lines of the predicate check that the envelope belongs to SimpleLink by checking its destination service and action. Then it extracts the three other fields of interest: the body, message id, and creation timestamp. Finally, it returns the assertion that includes the client and server principal names concatenated with the five message parts we want to protect. Since the link only mentions the service principal the client principal is replaced by a "*" representing an arbitrary principal.

For response messages, the computed assertion is quite similar except that the destination service (To) and action fields are replaced by the source service (From) and RelatesTo fields:

```
predicate hasLinkAssert(env:item,ass:items) :-
   hasHeaderFrom(env,Fromitm,Fromval),
   Fromval = "http://bobspetshop.com/service.asmx",
   hasHeaderMessageId(env,MessageIditm,MessageIdval),
   hasHeaderRelatesTo(env,RelatesToitm,RelatesToval),
   hasHeaderCreated(env,Createditm,Createdval),
   hasBody(env,bitm,bval),
   ass = ["BobsPetshop" "*" Fromval RelatesToval
      MessageIdval Createdval bval]
```

Here the link is identified by matching the From field to the link service URI. As before, message parts are then extracted and concatenated with the principal names if known.

Our generic SOAP sender takes an envelope from the attacker and sends it out after adding some security headers and encrypted blocks. If a link uses secrecy, then the body of the envelope is protected from the attacker. To model this, whenever a SOAP sender is asked to send a envelope on an encrypted link, it uses the mkLinkEnvelope predicate to replace the body of the message by a secret body B. The secrecy assertion is then that the attacker can never know B even if he observes several messages on different links.

private name B.
secret B.

For the example encrypted link, EncLink, the mkLinkEnvelope clause for request messages is given below; response messages are similar:

```
predicate mkLinkEnvelope(env:item,secretBody:item,outenv:item) :-
   hasHeaderTo(env,Toitm,Toval),
   hasHeaderAction(env,Actionitm,Actionval),
   Toval = "http://bobspetshop.com/service.asmx",
   Actionval = "http://premium",
   replaceBody(env,secretBody,outenv).
```

This clause checks whether the envelope belongs to EncLink and then replaces the body with a secret body (B). The data B represents all the data in the system that we wish to keep secret. Hence, it may only be sent out on encrypted links. In contrast, non-secret data can be sent out on any link; modeled by a mkLinkEnvelope clause that simply leaves the envelope unchanged.

Appendix D shows an exemplary mapping of links to security goals.

Analyzing Scripts Defined by a Link Spec and a Configuration

We define how to construct a TulaFale script to check whether a particular policy configuration achieves the security goals defined by a link description/spec 126. Given a link L, generator 124 generates clauses for the predicates hasLinkAssert and mkLinkEnvelope. Given a configuration C, generator 124 generates clauses for the predicates mkConformant and isConformant . These four predicates are embedded into the TulaFale model of SOAP processors: senders may use a secret body using mkLinkEnvelope, then they compute the integrity assertion using hasLinkAssert, invoke begin Log(ass), compute a policy compliant outgoing envelope using mkConformant and send the message on the network. Conversely, receivers check an incoming envelope for policy compliance using isConformant , and then compute the integrity assertion using hasLinkAssert before invoking end Log(ass).

To verify that the policy configuration satisfies the link security specification, checker 116 checks authenticity and secrecy goals running TulaFale. In this implementation, general definitions include, for example:

Definition 4.1 A TulaFale process is said to be robustly safe for Log, LogP, if whenever a receiver process invokes end Log([u] @ ass), either there is some sender process that has previously invoked begin Log([u] @ ass), or some token generator process has previously invoked begin LogP(u).

A TulaFale process is said to preserve secrecy of B for LogP, LogS, if whenever the attacker knows B, there is a principal u such that some token generator process has previously invoked begin LogP(u) and some sender process has previously invoked begin LogS(u,B).

A TulaFale process is said to be functionally adequate for Log(ass) if there is an execution of the process such that end Log(ass) is eventually invoked.

Consider the policy configuration SimpleConfig generated from the link specification, SimpleLink. The following theorem states that this configuration preserves the authenticity goals specified by the link:

Theorem 4.1 (Robust Safety for SimpleLink, SimpleConfig) The TulaFale script generated from SimpleLink and SimpleConfig is robustly safe for Log, LogP.

Similarly, the following theorem states that the policy configuration EncConfig generated from EncLink preserves the secrecy goals of EncLink:

Theorem 4.2 (Authenticity for EncLink, EncConfig) The TulaFale script generated from EncLink and EncConfig preserves the secrecy of B for LogP, LogS.

Since EncLink is a strictly stronger specification than SimpleLink, we can also establish robust safety for the script generated from EncLink and EncConfig. In the next section, we present general theorems that enable us to derive this property without running the analysis again.

Both the scripts we have generated can be shown to be functionally adequate for some assertions. The following theorem states this property for the script generated from SimpleLink and SimpleConfig.

Theorem 4.3 (Functional Adequacy for SimpleLink, SimpleConfig) There is an assertion ass such that the TulaFale process generated from SimpleLink and SimpleConfig is functionally adequate for Log(ass).

Logical Theory of Policies

In the previous section, we presented examples that illustrate how system 100 verifies correctness of a fixed policy configuration 118 against a link specification 126. However, the systems and methods for described herein with respect to FIGS. 1-6 are more general and can be used to state and prove theorems about general classes of policy configurations and link specifications, for example, as described below.

A Logical Semantics for Policies

One can treat security policies as logical formulae with integrity and confidentiality assertions as atomic propositions, combined using conjunction and disjunction. This leads to a natural notion of refinement: one policy refines another if any message that satisfies one will satisfy another.

Compilation to Tulafale provides a model of the logic: we can check that the basic axioms hold, and can be pushed through process configurations (e.g. comparing parallel compositions of servers to disjunctions of policies); we can also exhibit additional laws that hold in our model, e.g. authentication without signature for username tokens, and transitivity of multiple signatures sharing a fresh name. Such logical properties are useful, even if the logic is WS-Policy.

In particular, if policy refinement translates to preservation of security properties, then in order to check that a policy meets security goals, it suffices to show that it (logically, in the model) refines a policy that has been checked using TF.

Lemma 1 (Adapted from [1]) For some class of protocols expressed as TulaFale scripts, logical implication of top-level predicates preserve robust safety.

Lemma 2 If a policy $P_1$ refines $P_2$, then the send (receive) predicate generated from $P_1$ implies the send (receive) predicate generated from $P_2$.

Logical refinement can be extended to policy configurations: a configuration $C_1$ refines $C_2$ if $C_1$ is a subset of a configuration $C_1'$ that pointwise refines $C_2$.

Theorem 5.1 Given a link L and policy configuration C, if the TulaFale script generated from L and C is robustly safe, so is the script generated from L and C' where C' refines C.

We use a combination of manual and automated proofs to establish our main results.

Link Generated Policies

The policy configurations generated directly from link specifications are always safe. This is formalized by the following theorems.

Theorem 5.2 (Authenticity) For all links L, let C be the policy configuration generated from L, then the TulaFale script generated from L and C is robustly safe for Log (against insiders).

Theorem 5.3 (Secrecy) For all links L, let C be the policy configuration generated from L, then the TulaFale script generated from L and C preserves the secrecy of B (against insiders).

Theorem 5.4 (Functional Adequacy) For all links L, let C be the policy configuration generated from L, then the TulaFale script generated from L and C is functionally adequate.

Links and Send Policies

The refinement theorem for configuration states that strengthening a send policy preserves the robust safety of a policy configuration. In some cases, strong send policies may even compensate for weak server policies.

On the other hand, if server policies are strong enough to validate a link specification, then send policies are immaterial for authenticity.

Theorem 5.5 (Authenticity) For any link L, let C be the policy configuration generated from L, and let R contain all the receive policy maps in C. Then for any set S of send policy maps, the TulaFale script generated from L and S@R is robustly safe.

Conversely, secrecy depends only on send policies: Theorem 5.6 (Secrecy) For any link L, let C be the policy configuration generated from L, and let S contain all the receive policy maps in C. Then for any set R of receive policy maps, the TulaFale script generated from L and S@R preserves secrecy.

Exemplary Procedure for Generating Security Policies for Web Services

Figure 4:
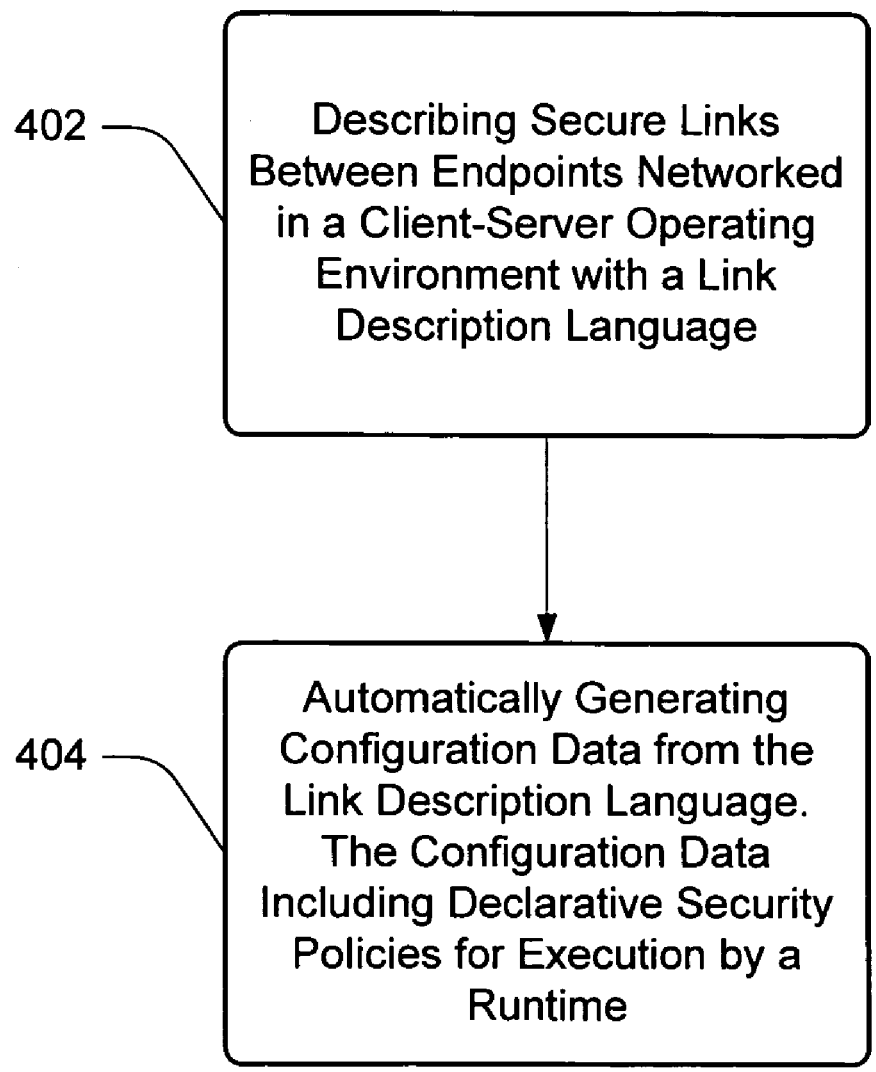
FIG. 4 illustrates an exemplary procedure for automatically generating security policies for web services.

FIG. 4 illustrates an exemplary procedure 400 for automatically generating security policies for Web services. For purposes of discussion, operations of the procedure are discussed in relation to the components of FIG. 1. (All reference numbers begin with the number of the drawing in which the component is first introduced). At block 402, secure links between endpoints networked in a client server operating environment are described. The secure links are described in a high-level link language 126 (FIG. 1). The secure links indicate security goals for the exchange of messages between machines during one or more sessions; a session being between a client acting on behalf of a client principal and the Web service act on behalf of the service principal. Security goals may include an indication that messages are signed, encrypted, or have associated signatures and combination authenticate respective client and/or Web service principals. An authenticity goal of a security goal may indicate that a service principal only accept a request message sent by a client principal, indicate that a client principal only accept a response message from a service principal, or indicate that any message is to be kept secret from a client or service principal that does not participate in the link.

In one implementation, a link of the secure links indicates a URI of a Web service, a set of allowed actions, a set of names of principals that may act as clients or as Web services, or secrecy levels of messages exchange between machines in one or more sessions. A session includes a request and a response exchange. The session may be a secure multi-message conversation between a client and server.

Operations of block 402 may include consuming abstract fixed-algorithm syntax for security policy configurations, including a service configuration with the receive policy and a send configuration. The receive policy corresponds to an action, client principal, or server principal. The send configuration corresponds to each client principal and server principal pair. Operations of block 402 may also include consuming abstract fixed-algorithm syntax for security policy configurations, wherein the configurations include—for a client device of the Web service, a send request policy and the receive response policy.

At block 404, generating module 124, automatically generates configuration data 118 from the link language 126. The configuration data includes declarative security policies associated with security protocols being used by a runtime 112. The configuration data may further include indications of services in actions supported by server and trust relationships between a client and the server. Further aspects about configuration data are described in the exemplary procedure for checking security goals of distributed system described below with respect to FIG. 5.

Exemplary Procedure for Checking Security Goals of a Distributed System

Figure 5:
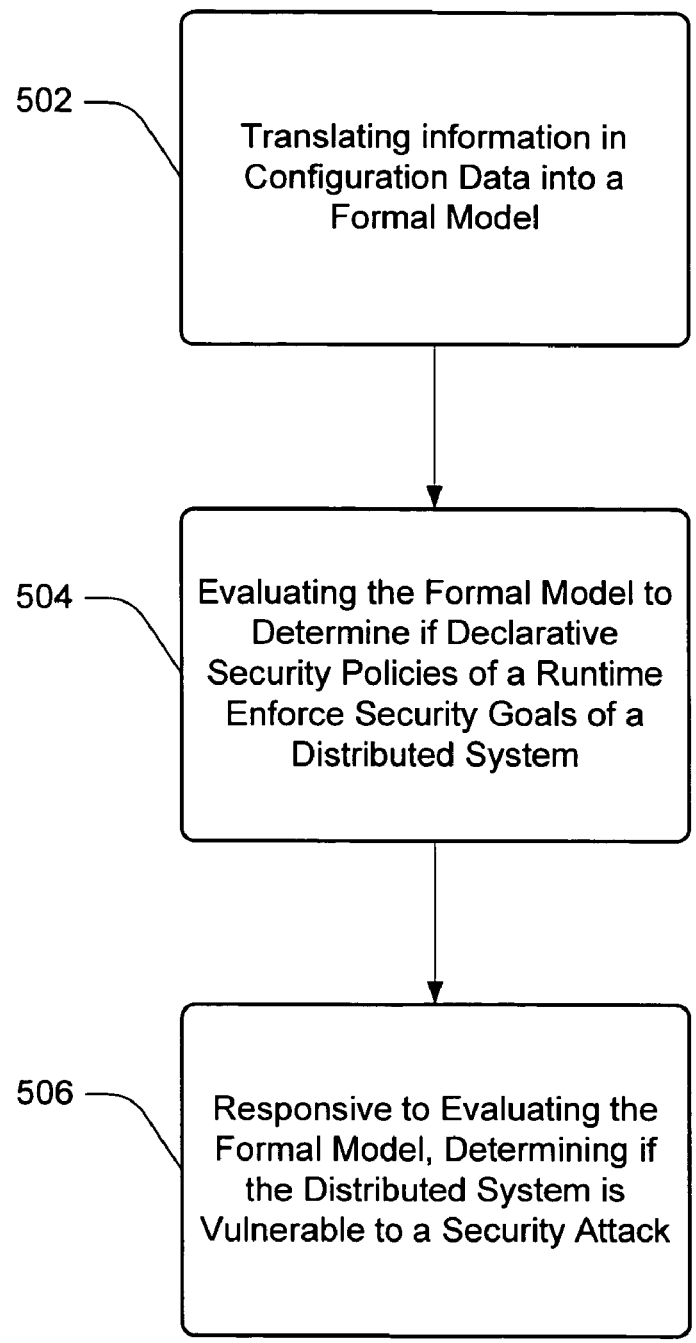
FIG. 5 illustrates an exemplary procedure for checking the security of web services configurations.

FIG. 5 illustrates an exemplary procedure 500 for checking the security of Web services configurations. For purposes of discussion, operations of the procedure 500 are discussed in relation to the components of FIG. 1. (All reference numbers begin with the number of the drawing in which the component is first introduced). At block 502, analyzer module 114 (FIG. 1) translates information in configuration data 118 into model 122. The configuration data includes declarative security policies associated with security protocols implemented by the runtime 112. In one implementation to declarative security policies include logical formulas over base assertions. The model 122 includes predicates expressing filtering and processing of messages communicated between computing devices in a distributed computing system 100 (FIG. 1).

In one implementation, configuration data 118 is generated via the exemplary procedure described above with respect to FIG. 4.

At block 504, checker module 116 evaluates the model 122 to determine if the declarative security policies of the runtime 112 enforce the security goals of the system 100. This evaluation operation includes automatically determining whether the declarative security policies are vulnerable to rewriting attacks. At block 506, checker module 116 determines if the distributed system 100 is vulnerable to security attack in view of the model's evaluation.

In one implementation, configuration data 118 corresponds to a security setting associated with first and second computer program application. In this implementation, operations of blocks 502 through 506 are performed as part of static analysis or a runtime analysis of the vulnerability of the system 100 to security attack.

An Exemplary Operating Environment

The systems and methods for automatically generating security policies for web services and checking the security of a Web service configuration are described in the general context of computer-executable instructions (program modules) being executed by a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 6:
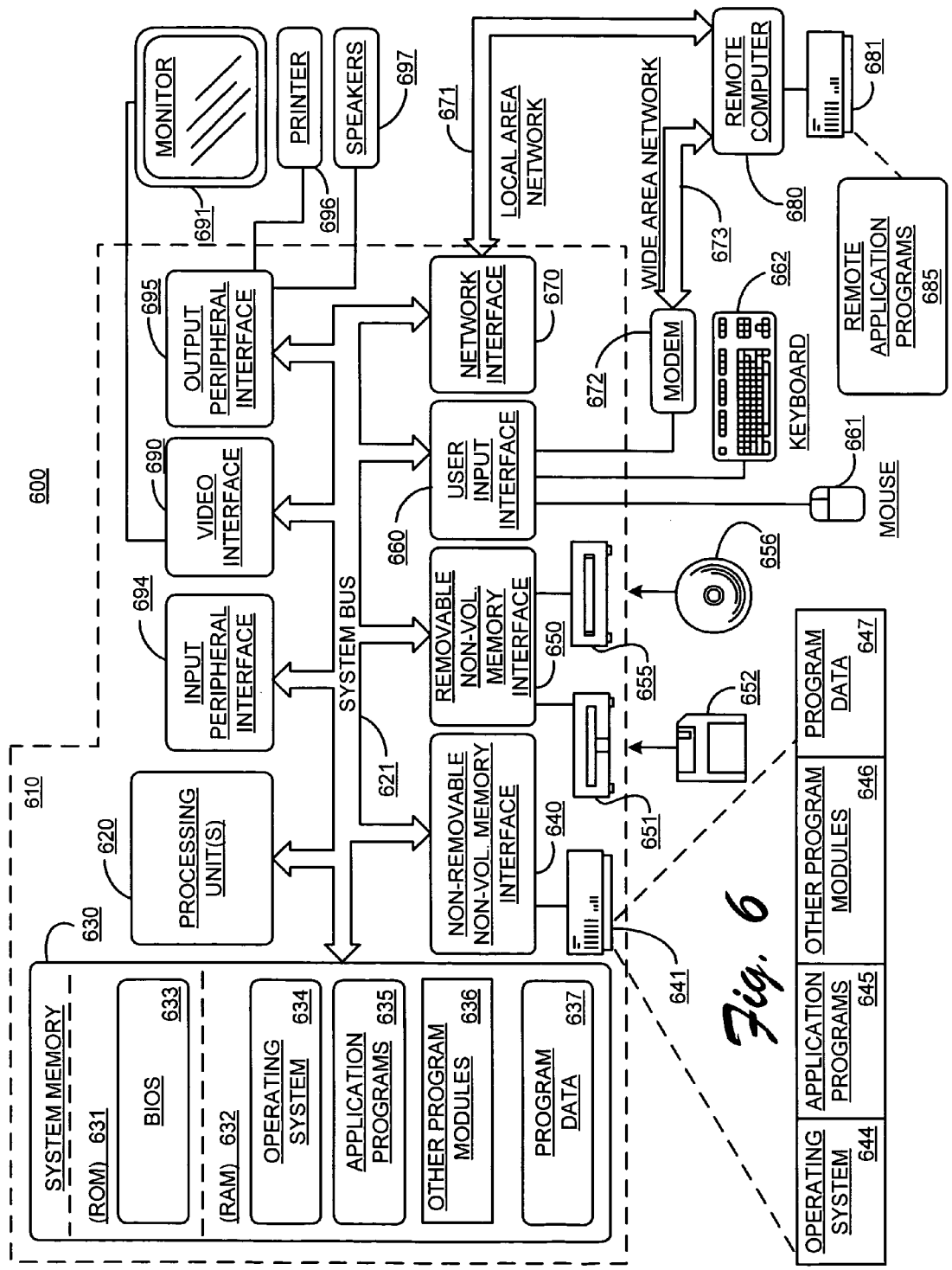
FIG. 6 shows an exemplary suitable computing environment on which the subsequently described systems, apparatuses and methods for automatically generating security policies for web services and checking the security of a Web service configuration may be fully or partially implemented.

FIG. 6 illustrates an example of a suitable computing environment on which the systems and methods for automatically generating security policies for web services and checking the security of a Web service configuration, for example, as shown and described with respect to FIGS. 1-6, may be fully or partially implemented. Exemplary computing environment 600 is only one example of a suitable computing environment and is not intended to suggest any limitation as to the scope of use or functionality of systems and methods described herein. Neither should computing environment 600 be interpreted as having any dependency or requirement relating to any one or combination of components illustrated in computing environment 600.

The methods and systems described herein are operational with numerous other general purpose or special purpose computing system environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 6, an exemplary system for automatically generating security policies for Web services includes a general purpose computing device in the form of a computer 610. The following described aspects of computer 610 are exemplary implementations computing device 102 and/or 104 of FIG. 1. Components of computer 610 may include, but are not limited to, processing unit(s) 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 610 typically includes a variety of computer-readable media. Computer-readable media can be any available media that can be accessed by computer 610 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during startup, is typically stored in ROM 631. RAM 632 typically contains data and/or program modules that are immediately accessible to and/or presently being operated on by processing unit 620. By way of example and not limitation, FIG. 6 illustrates operating system 634, application programs 635, other program modules 636, and program data 638. In one implementation, application programs 635 include, for example, program modules 108 of FIG. 1 and other computer-program modules such as "processors" (applications) to send and receive SOAP envelopes on behalf of principals. Program data 638 includes, for example, program data 110 of FIG. 1.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646, and program data 648. Note that these components can either be the same as or different from operating system 634, application programs 635, other program modules 636, and program data 638. Operating system 644, application programs 645, other program modules 646, and program data 648 are given different numbers here to illustrate that they are at least different copies.

A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB).

A monitor 691 or other type of display device is also connected to the system bus 621 via an interface, such as a video interface 690. In addition to the monitor, computers may also include other peripheral output devices such as speakers 698 and printer 696, which may be connected through an output peripheral interface 695.

The computer 610 operates in a networked environment using logical connections to one or more remote computers, such as a remote computer 680. The remote computer 680 may be a personal computer, a server, a router, a network PC, a peer device or other common network node, and as a function of its particular implementation, may include many or all of the elements described above relative to the computer 610, although only a memory storage device 681 has been illustrated in FIG. 6. The logical connections depicted in FIG. 6 include a local area network (LAN) 681 and a wide area network (WAN) 683, but may also include other networks. Such networking environments are commonplace in offices, enterprise-wide computer networks, intranets and the Internet.

When used in a LAN networking environment, the computer 610 is connected to the LAN 681 through a network interface or adapter 680. When used in a WAN networking environment, the computer 610 typically includes a modem 682 or other means for establishing communications over the WAN 683, such as the Internet. The modem 682, which may be internal or external, may be connected to the system bus 621 via the user input interface 660, or other appropriate mechanism. In a networked environment, program modules depicted relative to the computer 610, or portions thereof, may be stored in the remote memory storage device. By way of example and not limitation, FIG. 6 illustrates remote application programs 685 as residing on memory device 681. The network connections shown are exemplary and other means of establishing a communications link between the computers may be used.

Exemplary Development Tool Integration

In view of the above, the systems and methods of FIGS. 1-6 provide for safe/trustworthy computing. Such computing, for example, may include the following system 100 analysis operations:

Static Singleton Analysis—Given a single project and its associated supporting data, determine if desired security goals can be met and identify failures or other recommendations. This determines obvious attacks on the service.

Static Group Analysis—Given two (or more) projects and their associated supporting data, determine if desired security goals can be met and identify failures or other recommendations. This determines further attacks, such as indirect attacks using one project to compromise another.

Dynamic Analysis—As a service is about to connect to another service, in real time the supporting data for the service is obtained (possibly from caches, or using auxiliary protocols) and a security assessment is made as to whether or not the communication meets the haved goals. If not, exceptions can be thrown or the call can be blocked. This analysis can happen at different places, two embodiments include the CLR runtime and the communication infrastructure.

These examples and supporting data may vary. Supporting data includes, for example, code annotations, results of code analyses, security data, configuration information, policy information, libraries of known service analyses, libraries of known attacks and attack patterns, etc. The more data the more accurate the assessment (as a general rule), but system 100 can be configured to make best assessments given the available data or lower its evaluation based on the absence of data. Also, only some parts of the available data may be trustworthy. In these cases, a safe assessment is made with the available/limited data.

CONCLUSION

Although the systems and methods to check the security of web service configurations have been described in language specific to structural features and/or methodological operations or actions, it is understood that the implementations defined in the appended claims are not necessarily limited to the specific features or actions described. For example, in one implementation, model 122 is described as a formal model (e.g., using TulaFale scripting). Accordingly, the specific features and actions are disclosed as exemplary forms of implementing the claimed subject matter.

REFERENCES

[1] K. Bhargavan, C. Fournet, and A. D. Gordon. A semantics for Web services authentication. In 31St ACM Symposium on Principles of Programming Languages (POPL'04), pages 198-209, 2004. An extended version appears as Microsoft Research Technical Report MSR-TR-2003-83.

[2] K. Bhargavan, C. Fournet, A. D. Gordon, and R. Pucella. Tulafale: A security tool for Web services. Submitted for publication. Available from h_t_t_p_: _/_/_securing.ws, March 2004.

[3] B. Blanchet. An efficient cryptographic protocol verifier based on Prolog rules. In Proceedings of the 14th IEEE Computer Security Foundations Workshop, pages 82-96. IEEE Computer Society Press, 2001.

[4] B. Blanchet. From secrecy to authenticity in security protocols. In Proceedings of the 3th International Static Analysis Symposium (SAS'02), volume 2477 of Lecture Notes in Computer Science, pages 342-359. Springer-Verlag, 2002.

[5] D. Box, F. Curbera, M. Hondo, C. Kaler, D. Langworthy, A. Nadalin, N. Nagaratnam, M. Nottingham, C. von Riegen, and J. Shewchuk. Web services policy framework (WS-Policy). May 2003.

[6] D. Box, M. Hondo, C. Kaler, H. Maruyama, A. Nadalin, N. Nagaratnam, P. Patrick, C. von Riegen, and J. Shewchuk. Web services policy assertions language (WS-PolicyAssertions), May 2003.

[7] G. Della-Libera, P. Hallam-Baker, M. Hondo, T. Janczuk, C. Kaler, H. Maruyama, N. Nagaratnam, A. Nash, R. Philpott, H. Prafullchandra, J. Shewchuk, E. Waingold, and R. Zolfonoon. Web services security policy language (WS-SecurityPolicy). December 2002.

APPENDIX A

An Exemplary Library Script

```
1  // term constructors
2  constructor concat(bytes,bytes):bytes.
3  constructor c14n(item):bytes.
4  constructor utf8(string):bytes.
5  constructor sha1(bytes):bytes.
6  constructor psha1(string,bytes):bytes.
7  constructor hmacsha1(bytes,bytes):bytes.
8  constructor pk(bytes):bytes.
9  constructor rsasha1(bytes,bytes):bytes.
10 constructor x509(bytes,string,string,bytes):bytes.
11 constructor base64(bytes):string.
12 constructor principal(string):string.
13 constructor rsa(bytes,bytes):bytes.
14 constructor aes(bytes,bytes):bytes.
15
16 // term destructors, with rewrite rules
17 destructor fst(string):string with fst(concat(a,b)) = a.
18 destructor snd(string):string with snd(concat(a,b))=b.
19 destructor ibase64(string):bytes with ibase64(base64(x))=x.
20 destructor x509key(bytes):bytes with x509key(x509(s,u,a,k))=k.
21 destructor checkx509(bytes,bytes):bytes with checkx509(x509(s,u,a,k),pk(s))=pk(s
22 ).
23 destructor checkrsasha1(bytes,bytes,bytes):bytes with checkrsasha1(pk(k),x,rsasha
24 1(k,x))=pk(k).
25 destructor iutf8(bytes):string with iutf8(utf8(x))=x.
26 destructor x509user(bytes):string with x509user(x509(s,u,a,k))=u.
27 destructor x509alg(bytes):string with x509alg(x509(s,u,a,k))=a.
28 destructor ic14n(bytes):item with ic14n(c14n(x))=x.
29 destructor decrsa(bytes,bytes):bytes with decrsa(k,rsa(pk(k),b)) = b.
30 destructor decaes(bytes,bytes):bytes with decaes(k,aes(k,b)) = b.
31
32 predicate hasBody (env:item,bitm:item,b:item) :-
33    env = <Envelope> <Header> @ _ </> bitm </>,
34    bitm = <Body @ _> b </>.
35
36 predicate hasHeaderTo (env:item,h:item,v:item) :-
37    env = <Envelope> <Header> @ hs </> @ _ </>,
38    hs = [h ac id sec @ _],
39    h = <To>v</>.
40
41 predicate hasHeaderAction (env:item,h:item,v:item) :-
42    env = <Envelope> <Header> @ hs </> @ _ </>,
1     hs = [to h id sec @ _],
2     h = <Action>v</>.
3
4  predicate hasHeaderFrom (env:item,h:item,v:item) :-
```

APPENDIX A-continued

An Exemplary Library Script

```
 5    env = <Envelope> <Header> @ hs </> @ _ </>,
 6    hs = [h rid id sec @ _],
 7    h = <From>v</>.
 8
 9  predicate hasHeaderMessageId (env:item,h:item,v:item) :-
10    env = <Envelope> <Header> @ hs </> @ _ </>,
11    hs = [to ac h sec @ _],
12    h = <MessageId>v</>.
13
14  predicate hasHeaderRelatesTo (env:item,h:item,v:item) :-
15    env = <Envelope> <Header> @ hs </> @ _ </>,
16    hs = [from h id sec @ _],
17    h = <RelatesTo>v</>.
18
19  predicate hasSecurityHeader (env:item,toks:items) :-
20    env = <Envelope> <Header> @ hs </> @ _ </>.
21    hs = [to ac id h @ _],
22    h = <Security> @ toks </>.
23
24  predicate hasHeaderCreated (env:item,h:item,v:item) :-
25    hasSecurityHeader(env,toks),
26    toks = [t @ _],
27    t = <Timestamp>h @ _ </>,
28    h = <Created>v</>.
29
30  predicate replaceMessageId(env:item,id:item,outenv:item) :-
31    env = <Envelope> <Header> @ hs </> @ b </>,
32    hs = [to ac h sec @ o],
33    h = <MessageId>v</>,
34    newh = <MessageId>id</>,
35    outenv = <Envelope><Header>to ac newh sec @ o </> @ b </>.
36
37  predicate replaceRelatesTo(env:item,rto:item,outenv:item) :-
38    env = <Envelope> <Header> @ hs </> @ b </>,
39    hs = [from h id sec @ o],
40    h = <RelatesTo>v</>,
41    newh = <RelatesTo>rto</>,
42    outenv = <Envelope><Header>from newh id sec @ o </> @ b </>.
 1
 2  predicate isUserTokenKey (tok:item,u:string,pwd:string,n:bytes,t:string,k:bytes) :-
 3
 4    tok = <UsernameToken @ _>
 5        <Username>          u           </>
 6        _
 7        <Nonce> base64(n) </>
 8        <Created> t </> </>,
 9                  u =         principal(pwd),
10    psha1(pwd,concat(n,utf8(t))) = k.
11
12  predicate mkUserTokenKey (tok:item,u:string,pwd:string,n:bytes,t:string,k:bytes)
13  :-
14    tok = <UsernameToken>
15        <Username>          u           </>
16      <Password Type="None"></>
17        <Nonce> base64(n) </>
18        <Created> t </> </>,
19    k = psha1(pwd,concat(n,utf8(t))).
20
21  predicate isX509Cert (xcert:bytes, kr:bytes,u:string,a:string,k:bytes) :-
22    checkx509(xcert,kr) = kr,
23    x509user(xcert) = u,
24    x509key(xcert) = k,
25    x509alg(xcert) = a.
26
27  predicate isX509Token (tok:item,kr:bytes,u:string,a:string,k:bytes) :-
28    tok = <BinarySecurityToken ValueType="X509v3"> base64(xcert) </>,
29    isX509Cert (xcert,kr,u,a,k).
30
31
32  predicate isUserPassword (up:item,u:string,pwd:string) :-
33    up = <UserPassword>
34        <Username>          u           </>
35      <Password> pwd </> </>.
36
37  predicate isX509CertSecret (xsc:item,xtok:item,sk:bytes,cak:bytes) :-
38    xsc = <X509CertSecret>
39      xtok
```

APPENDIX A-continued

An Exemplary Library Script

```
40    <SecretKey>base64(sk)</>
41    <CAPubKey>base64(cak)</></>,
42    xtok = <BinarySecurityToken ValueType="X509v3">base64(cert)</>.
1
2
3  predicate isSigVal (sv:bytes,si:item,p:bytes,a:string) :-
4     "rsasha1" = a,
5     p = checkrsasha1(p,c14n(si),sv).
6
7  predicate mkSigVal (sv:bytes,si:item,p:bytes,a:string) :-
8     "rsasha1" = a,
9     sv = rsasha1(p,c14n(si)).
10
11 predicate isSigVal (sv:bytes,si:item,k:bytes,a:string) :-
12    "hmacsha1" = a,
13    hmacsha1(k,c14n(si)) = sv.
14
15 predicate mkSigVal (sv:bytes,si:item,k:bytes,a:string) :-
16    "hmacsha1" = a,
17    hmacsha1(k,c14n(si)) = sv.
18
19 predicate ref(t:item,r:item) :-
20    r = <Reference> _ _ <DigestValue> base64(sha1(c14n(t))) </> </>.
21
22 predicate mkRef(r:item,t:item) :-
23    r = <Reference> <Junk></> <Junk></> <DigestValue> base64(sha1(c14n(t))) </
24 > </>.
25
26 predicate isSigInfo (si:item,a:string,x:item) :-
27    si = <SignedInfo>_ <SignatureMethod Algorithm=a> </> @ rl </>,
28    r in rl,
29    ref(x,r).
30
31 predicate isSignature (sig:item,a:string,k:bytes,x:item) :-
32    sig = <Signature> si <SignatureValue> base64(sv) </> @ _ </>,
33    isSigInfo(si,a,x),
34    isSigVal(sv,si,k,a).
35
36 predicate isCipherValue (ef:item,a:string,k:bytes,f:item) :-
37    ef = <EncryptedData>
38    <EncryptionMethod Algorithm="rsa"> </>
39    <KeyInfo>_</>
40    <CipherData><CipherValue>base64(cv)</></></>,
41    a = "rsa",
42    ic14n(decrsa(k,cv)) = f.
1
2  predicate mkCipherValue (ef:item,a:string,k:bytes,f:item) :-
3     a = "rsa",
4     cv = rsa(k,c14n(f)),
5     ef = <EncryptedData>
6     <EncryptionMethod Algorithm="rsa"> </>
7     <KeyInfo></>
8     <CipherData><CipherValue>base64(cv)</></></>.
9
10 predicate mkSignature (sig:item,a:string,k:bytes,refs:items) :-
11    si = <SignedInfo><Junk></>
12       <SignatureMethod Algorithm=a> </> @ refs </>,
13    mkSigVal(sv,si,k,a),
14    sig = <Signature> si <SignatureValue> base64(sv) </> </>.
15
16 predicate replaceBody(env:item, newbody:item, newenv:item) :-
17    env = <Envelope> <Header> @ hs </> b </>,
18    newenv = <Envelope> <Header> @ hs </> newbody </>.
```

APPENDIX B

Exemplary/Sample Policy

```
1  <PolicyMappings>
2  <SendPolicy>
3     <To>
4        http://service.asmx
5     </To>
6     <Action>http://premium</Action>
```

APPENDIX B-continued

Exemplary/Sample Policy

```
7    <Policy Id="ClientToServer1">
8    <All>
9    <Integrity>
10      <TokenInfo>
11        <SecurityToken>
12         <TokenType>UsernameToken</TokenType>
13         <Claims><SubjectName>Alice</SubjectName></Claims>
14        </SecurityToken>
15      </TokenInfo>
16      <MessageParts>Body( ) Header("To") Header("Action") Header("MessageId")
17 Header("Created")</MessageParts>
18    </Integrity>
19    <Confidentiality>
20      <TokenInfo>
21        <SecurityToken>
22         <TokenType>X509v3</TokenType>
23         <Claims><SubjectName>BobsPetshop</SubjectName></Claims>
24        </SecurityToken>
25      </TokenInfo>
26      <MessageParts>Body( )</MessageParts>
27    </Confidentiality>
28    </All>
29    </Policy>
30 </SendPolicy>
31 <ReceivePolicy>
32    <To>
33    http://service.asmx
34    </To>
35    <Action>http://premium</Action>
36    <Policy Id="ClientToServer2">
37    <All>
38    <Integrity>
39      <TokenInfo>
40        <SecurityToken>
41         <TokenType>UsernameToken</TokenType>
42         <Claims><SubjectName>Alice</SubjectName></Claims>
1         </SecurityToken>
2       </TokenInfo>
3       <MessageParts>Body( ) Header("To") Header("Action") Header("MessageId")
4  Header("Created")</MessageParts>
5     </Integrity>
6     <Confidentiality>
7       <TokenInfo>
8         <SecurityToken>
9          <TokenType>X509v3</TokenType>
10         <Claims><SubjectName>BobsPetshop</SubjectName></Claims>
11        </SecurityToken>
12      </TokenInfo>
13      <MessageParts>Body( )</MessageParts>
14    </Confidentiality>
15    </All>
16    </Policy>
17 </ReceivePolicy>
18 <SendPolicy>
19    <To>default</To>
20    <Action>default</Action>
21    <Policy Id="ServerToClient3">
22    <Integrity>
23      <TokenInfo>
24        <SecurityToken>
25         <TokenType>X509v3</TokenType>
26         <Claims><SubjectName>BobsPetshop</SubjectName></Claims>
27        </SecurityToken>
28      </TokenInfo>
29      <MessageParts>Body( ) Header("From") Header("RelatesTo") Header("Message Id")
30 Header("Created")</MessageParts>
31    </Integrity> </Policy>
32 </SendPolicy>
33 <ReceivePolicy>
34    <To>default</To>
35    <Action>default</Action>
36    <Policy Id="ServerToClient4">
37    <Integrity>
38      <TokenInfo>
39        <SecurityToken>
40         <TokenType>X509v3</TokenType>
41         <Claims><SubjectName>BobsPetshop</SubjectName></Claims>
```

APPENDIX B-continued

Exemplary/Sample Policy

```
42        </SecurityToken>
 1      </TokenInfo>
 2      <MessageParts>Body( ) Header("From") Header("RelatesTo") Header("MessageId")
 3  Header("Created")</MessageParts>
 4      </Integrity> </Policy>
 5  </ReceivePolicy>
 6  </PolicyMappings>
```

APPENDIX C

Exemplary Translation from Policy Configurations to Predicates

```
 1                       Rules for Filters
 2  ─────────────────────────────────────────────
 3  ────
 4  PartClause(Body)
 5
 6    hasBody(env,bitm,bval)
 7  PartClause(Header("tag"))
 8
 9    hasHeadertag(env,tagitm,tagval)
10  PartClauses([pt1,...,ptn]) Part(pt1),...,Part(ptn)
11
12  PartValue(Body) bval
13
14  PartValue(Header("tag")) tagval
15
16  PartValues([pt1,...,ptn]) [PartValue(pt1),...,PartValue(ptn)]
17  PartItem(Body) bval
18
19  PartItem(Header("tag")) ,tagitm
20
21  PartItems([pt1,...,ptn]) [PartItem(pt1),...,PartItem(ptn)]
22  SendPartClauses
23
24  ReceivePartClauses
25
26  Parts(Integrity(tk,pts)) pts
27
28  Parts(Confidentiality(tk,pts)) pts
29
30  Parts(None(tk,pts)) [ ]
31
32  Parts(All[pol1,...,poln] i 1...nParts(poli)
33
34  Parts(OneOrMore[pol1,...,poln] i 1...nParts(poli)
35
36  S[[Integrity(Username,pts)]]
37
38    infresh = [n t @ outfresh],
39    getUsernameToken(utok,u,k,idents,n,t)
40    mkSignature(sig,"hmacsha1",k,pts)
41  S[[Integrity(Username(s),pts)]]
42
43    infresh = [n t @ outfresh],
44    getUsernameToken(utok,s,k,idents,n,t)
45    mkSignature(sig,"hmacsha1",k,pts)
46  S[[Integrity(X509,pts)]]
47
48    outfresh = infresh,
49    getX509Token(xtok,u,sk,xk,idents)
50    mkSignature(sig,"rsasha1",sk,pts)
51  S[[Integrity(X509(s),pts)]]
52
53    outfresh = infresh,
 1    getX509Token(xtok,s,sk,xk,idents)
 2    mkSignature(sig,"rsasha1",sk,pts)
 3
 4  S[[Confidentiality(X509,[part1,...,partn])]]
 5
 6    outfresh = infresh,
 7    getX509Token(xtok,u,sk,xk,idents)
 8    mkCipherValue(PartItem(part1)enc,"rsa",xk,PartItem(part1))
```

APPENDIX C-continued

Exemplary Translation from Policy Configurations to Predicates

```
 9
10
11    mkCipherValue(PartItem(partn)enc,"rsa",xk,PartItem(partn))
12  S[[Confidentiality(X509(s),[part1,...,partn])]]
13
14    outfresh = infresh,
15    getX509Token(xtok,s,sk,xk,idents)
16    mkCipherValue(PartItem(part1)enc,"rsa",xk,PartItem(part1))
17
18
19    mkCipherValue(PartItem(partn)enc,"rsa",xk,PartItem(partn))
20  S[[All[pol1,...,poln]]]
21
22    hasSendPolicy1(env,idents,infresh,outfresh1,outenv1),
23       where hasSendPolicy1(e,i,if,of,oe) :- S[[pol1]]
24    infresh2 = outfresh1,
25    env2 = outenv1,
26    hasSendPolicy2(env2,idents,infresh2,outfresh2,outenv2),
27       where hasSendPolicy(e,i,if,of,oe)2:- S[[pol2]]
28
29
30    infreshn = outfreshn−1,
31    envn = outenvn−1,
32    hasSendPolicyn(envn,idents,infreshn,outfreshn,outenvn),
33       where hasSendPolicy(e,i,if,of,oe)n:- S[[poln]]
34  S[[OneOrMore[pol1,...,poln]]] S[[pol1]] ... S[[poln]]
35
36  R[[Integrity(Username,pts)]]
37
38    hasSecurityHeader(env,toks),
39    utok in toks,
40    sig in toks,
41    checkUsernameToken(utok,u,k,idents,n,t)
42    isSignature(sig,"hmacsha1",k,PartItems(pts))
43  R[[Integrity(Username(s),pts)]]
44
45    hasSecurityHeader(env,toks),
46    utok in toks,
47    sig in toks,
48    checkUsernameToken(utok,s,k,idents,n,t)
49    isSignature(sig,"hmacsha1",k,PartItems(pts))
50  R[[Integrity(X509,pts)]]
51
52    hasSecurityHeader(env,toks),
53    xtok in toks,
 1    sig in toks,
 2    checkX509Token(xtok,u,xk,idents)
 3    isSignature(sig,"rsasha1",k,PartItems(pts))
 4  R[[Integrity(X509(s),pts)]]
 5
 6    hasSecurityHeader(env,toks),
 7    xtok in toks,
 8    sig in toks,
 9    checkX509Token(xtok,s,xk,idents)
10    isSignature(sig,"rsasha1",k,PartItems(pts))
11  R[[Confidentiality(X509,[part1,...,partn])]]
12
13    getX509Token(xtok,u,sk,xk,idents)
14    isCipherValue(PartItem(part1)enc,"rsa",xk,PartItem(part1))
15
16
```

APPENDIX C-continued

Exemplary Translation from Policy Configurations to Predicates

```
17    isCipherValue(PartItem(partn)enc,"rsa",xk,PartItem(partn))
18  R[[Confidentiality(X509(s),[part1,...,partn])]]
19
20    getX509Token(xtok,s,sk,xk,idents)
21    isCipherValue(PartItem(part1),"rsa",xk,PartItem(part1)dec)
22
23    ...
24    isCipherValue(PartItem(partn),"rsa",xk,PartItem(partn)dec)
25  R[[All[pol1,...,poln]]] R[[pol1]],...,R[[poln]]
26
27  R[[OneOrMore[pol1,...,poln]]] R[[pol1]] ... R[[poln]]
28
29
30  F[[Default]]
31
32  F[[ToDefault(suri)]] Toval = suri
33
34  F[[ToAction(suri,ac)]]
35
36    Toval = suri,
37    Actionval = ac
38  F[[Send(addr,pol)]]
39
40    fresh = [MessageIdval @ infresh],
41    MessageIditm = <MessageId>MessageIdval</>,
42    PartClauses(Parts(pol)\[Header("MessageId")]),
43    F[[addr]],
44    S[[pol]]
45  F[[Receive(addr,pol)]]
46
47    PartClauses(Parts(pol)),
48    F[[addr]],
49    R[[pol]]
50  _____
51  _____
```

APPENDIX D

Exemplary Translations from Link Description to Configuration Data (Policies and Assertions)

```
1
2  _____
3  _____
4  ToParts
5
6    [Header("To"),Header("Action"),   Server address (URI, action)
7    Header("MessageId"),Header("Created"),   Request id,
8  timestamp
9    Body]          Request message contents
10
11 FromParts
12
13   [Header("From"),Header("RelatesTo"),   Server URI, request id
14   Header("MessageId"),Header("Created"),   Reply id, timestamp
15   Body]          Reply message contents
16
17 Tokens(Any) {Username,X509}
18 Tokens([p1:string,...,pn:])
19
20   {Username(p1),X509(p1),...,Username(pn),X509(pn)}
21
22 ToPol(ctk :Token,stk :Token,secrlvl :Secr)
23
24   Integrity(ctk,ToParts)       if secrlvl = Clear
25   All[Integrity(ctk,ToParts),
26     Confidentiality(stk,Body)]    if secrlvl = Encrypted
27
28 FromPol(ctk :Token,stk :Token,secrlvl :Secr)
29
30   Integrity(stk,FromParts)     if secrlvl = Clear
31   All[Integrity(stk,FromParts),
32     Confidentiality(ctk,Body)]   if secrlvl = Encrypted
33
```

APPENDIX D-continued

Exemplary Translations from Link Description to Configuration Data (Policies and Assertions)

```
34 GS[[(suri :URI,actions :List(URI),cps :PrincipalSet,sps
35 :PrincipalSet, secrlvl :Secr)]]
36
37   [Receive(ToAction(suri,ac),ToPol(ctk,stk,secrlvl))
38    | ac actions,ctk Tokens(cps),stk Tokens(sps)]@
39
40   [Send(Default,FromPol(ctk,stk,secrlvl))
41    | ctk Tokens(cps),stk Tokens(sps)]
42 GC[[(suri :URI,actions :List(URI),cps :PrincipalSet,sps :PrincipalSet,
43 secrlvl :Secr)]]
44
45   [Send(ToAction(suri,ac),ToPol(ctk,stk,secrlvl))
46    | ac actions,ctk Tokens(cps),stk Tokens(sps)]@
47
48   [Receive(Default,FromPol(ctk,stk,secrlvl))
49    | ctk Tokens(cps),stk Tokens(sps)]
50  _____
51  _____
52 Rules for Asserts
1   _____
2   _____
3  Principal(Any) " * "
4
5  Principal([p]) "p"
6
7  Principal([p1,p2,...]) " * "
8
9  ToClause(cp :string,sp :string,suri :URI,ac :URI)
10
11   PartClauses(ToParts),
12   Toval = suri,
13   Actionval = ac,
14   ass = [cpsp]@PartValues(ToParts)
15 FromClause(cp :string,sp :string,suri :URI,ac :URI)
16
17   PartClauses(FromParts),
18   Fromval = suri,
19   ass = [spcp]@PartValues(FromParts)
20 A[[(suri :URI,ac :URI,cps :PrincipalSet,sps :PrincipalSet,
   Encrypted:Secr)]]
21
22   PartClauses([Header("To"),Header("Action")]),
23   Toval = suri,
24   Actionval = ac,
25   replaceBody(env,secretBody,outenv)
26 A[[(suri :URI,ac :URI,cps :PrincipalSet,sps :PrincipalSet,
   Encrypted:Secr)]]
27
28   PartClauses([Header("From")]),
29   Fromval = suri,
30   replaceBody(env,secretBody,outenv)
31 A[[(suri :URI,ac :URI,cps :PrincipalSet,sps :PrincipalSet,secr
   :Secr)]]
32
33   outenv = env
34  _____
35  _____
```

APPENDIX E

| Exemplary Generated TulaFale script |
|---|

```
1
2  import "library.tf".
3
4  predicate hasSendPolicyClientToServer11(env0:item,idents:items,fresh0:items,
5  fresh1:items,env1:item) :-
6     fresh0 = [n10 t11 @ fresh1],
7     up7 in idents,
8     hasBody(env0,itmb1,b1),
9     hasHeaderTo(env0,itmTo2,To2),
10    hasHeaderAction(env0,itmAction3,Action3),
11    hasHeaderMessageId(env0,itmMessageId4,MessageId4),
12    hasHeaderCreated(env0,itmCreated5,Created5),
13    isUserPassword(up7,"Alice",p9),
14    nby10 = c14n(n10),
15    tstr11 = base64(c14n(t11)),
16    mkUserTokenKey(utok6,"Alice",p9,nby10,tstr11,k12),
17    mkRef(refb1,itmb1),
18    mkRef(refTo2,itmTo2),
19    mkRef(refAction3,itmAction3),
20    mkRef(refMessageId4,itmMessageId4),
21    mkRef(refCreated5,itmCreated5),
22    mkSignature(sig13,"hmacsha1",k12,[refb1 refTo2 refAction3 retMessageId4 ref
23 Created5]),
24    env0 = <Envelope >inhdrs <Body >inbody</></>,
25    env1 = <Envelope ><Header >itmTo2 itmAction3 itmMessageId4 itmCreated5 <
26 Security >utok6 sig13</></> <Body >inbody</></>.
27
28 predicate hasSendPolicyClientToServer12(env1:item,idents:items,fresh1:items,
29 fresh2:items,env2:item) :-
30    fresh1 = fresh2,
31    xcs16 in idents,
32    hasBody(env1,itmb14,b14),
33    isX509CertSecret(xcs16,xtok17,sk20,cak21),
34    isX509Token(xtok17,cak21,"BobsPetshop","rsasha1",k19),
35    mkCipherValue(encb14,"rsa",k19,itmb14),
36    env1 = <Envelope >inhdrs <Body >inbody</></>,
37    env2 = <Envelope >inhdrs <Body >encb14</></>.
38
39 predicate hasSendPolicyClientToServer1(env:item,idents:items,fresh:items,
40 outfresh:items,outenv:item) :-
41    fresh = fresh0,
42    env = env0,
43    hasSendPolicyClientToServer11(env0,idents,fresh0,fresh1,env1),
1     hasSendPolicyClientToServer12(env1,idents,fresh1,fresh2,env2),
2     outfresh = fresh2,
3     outenv = env2.
4
5  predicate hasSendPolMap(env:item,idents:items,fresh:items,outenv:item) :-
6     hasHeaderTo(env,toitm,to),
7     to = "httpserviceasmx",
8     hasHeaderAction(env,acitm,ac),
9     ac = "httppremium",
10    hasSendPolicyClientToServer1(env,idents,fresh,outfresh,outenv).
11
12 predicate hasReceivePolicyClientToServer21(env:item,idents:items,toks0:items,
13 toks1:items) :-
14    up9 in idents,
15    hasBody(env,itmb1,b1),
16    hasHeaderTo(env,itmTo2,To2),
17    hasHeaderAction(env,itmAction3,Action3),
18    hasHeaderMessageId(env,itmMessageId4,MessageId4),
19    hasHeaderCreated(env,itmCreated5,Created5),
20    hasSecurityHeader(env,toks7),
21    utok6 in toks7,
22    isUserPassword(up9,"Alice",p10),
23    isUserTokenKey(utok6,"Alice",p10,n11,t12,k13),
24    sig14 in toks7,
25    isSignature(sig14,"hmacsha1",k13,itmb1),
26    isSignature(sig14,"hmacsha1",k13,itmTo2),
27    isSignature(sig14,"hmacsha1",k13,itmAction3),
28    isSignature(sig14,"hmacsha1",k13,itmMessageId4),
29    isSignature(sig14,"hmacsha1",k13,itmCreated5),
30    ass15 = <Integrity ><Token >utok6</> <Parts >b1 To2 Action3 MessageId4
31 Created5</></>,
32    toks1 = [ass15 @ toks0].
33
34 predicate hasReceivePolicyClientToServer22(env:item,idents:items,toks1:items,
```

APPENDIX E-continued

Exemplary Generated TulaFale script

```
35  toks2:items) :-
36    xcs18 in idents,
37    hasBody(env,itmb16,b16),
38    isX509CertSecret(xcs18,xtok19,sk22,cak23),
39    isX509Token(xtok19,cak23,"BobsPetshop","rsasha1",k21),
40    isCipherValue(itmb16,"rsa",k21,decb16),
41    ass24 = <Confidentiality ><Token >xtok 19</> <Parts >decb16</></>,
42    toks2 = [ass24 @ toks1].
 1
 2  predicate hasReceivePolicyClientToServer2(env:item,idents:items,oldass:items,
 3  ass:items) :-
 4    oldass = toks0,
 5    hasReceivePolicyClientToServer21(env,idents,toks0,toks1),
 6    hasReceivePolicyClientToServer22(env,idents,toks1,toks2),
 7    ass = toks2.
 8
 9  predicate hasReceivePolMap(env:item,idents:items,ass:items) :-
10    hasHeaderTo(env,toitm,to),
11    to = "httpserviceasmx",
12    hasHeaderAction(env,acitm,ac),
13    ac = "httppremium",
14    hasReceivePolicyClientToServer2(env,idents,[ ],ass).
15
16  predicate hasSendPolicyServerToClient3(env:item,idents:items,fresh:items,
17  outfresh:items,outenv:item) :-
18    fresh = outfresh,
19    xcs9 in idents,
20    hasBody(env,itmb1,b1),
21    hasHeaderFrom(env,itmFrom2,From2),
22    hasHeaderRelatesTo(env,itmRelatesTo3,RelatesTo3),
23    hasHeaderMessageId(env,itmMessageId4,MessageId4),
24    hasHeaderCreated(env,itmCreated5,Created5),
25    isX509CertSecret(xcs9,xtok6,sk10,cak11),
26    isX509Token(xtok6,cak11,"BobsPetshop","rsasha1",k8),
27    mkRef(refb1,itmb1),
28    mkRef(refFrom2,itmFrom2),
29    mkRef(refRelatesTo3,itmRelatesTo3),
30    mkRef(refMessageId4,itmMessageId4),
31    mkRef(refCreated5,itmCreated5),
32    mkSignature(sig12,"rsasha1",sk10,[refb1 refFrom2 refRelatesTo3 refMessageId4
33  refCreated5]),
34    env = <Envelope >inhdrs <Body >inbody</></>,
35    outenv = <Envelope ><Header >itmfrom2 itmRelatesTo3 itmMessageId4 itmCreated5
36  <Security >xtok6 sig12</></> <Body >inbody</></>.
37
38  predicate hasSendPolMap(env:item,idents:items,fresh:items,outenv:item) :-
39    hasSendPolicyServerToClient3(env,idents,fresh,outfresh,outenv).
40
41  predicate hasReceivePolicyServerToClient4(env:item,idents:items,oldass:items,
42  ass:items) :-
 1    xk8 in idents,
 2    hasBody(env,itmb1,b1),
 3    hasHeaderFrom(env,itmFrom2,From2),
 4    hasHeaderRelatesTo(env,itmRelatesTo3,RelatesTo3),
 5    hasHeaderMessageId(env,itmMessageId4,MessageId4),
 6    hasHeaderCreated(env,itmCreated5,Created5),
 7    isX509CertSecret(xk8,xx,yy,cak10),
 8    hasSecurityHeader(env,toks7),
 9    xtok6 in toks7,
10    isX509Token(xtok6,cak10,"BobsPetshop","rsasha1",k11),
11    sig12 in toks7,
12    isSignature(sig12,"rsasha1",k11,itmb1),
13    isSignature(sig12,"rsasha1",k11,itmFrom2),
14    isSignature(sig12,"rsasha1",k11,itmRelatesTo3),
15    isSignature(sig12,"rsasha1",k11,itmMessageId4),
16    isSignature(sig12,"rsasha1",k11,itmCreated5),
17    ass13 = <Integrity ><Token >xtok6</> <Parts >b1 From2 RelatesTo3 MessageId4
18  Created5</></>,
19    ass = [ass13 @ oldass].
20
21  predicate hasReceivePolMap(env:item,idents:items,ass:items) :-
22    hasReceivePolicyServerToClient4(env,idents,[ ],ass).
23
24  predicate getChanAssert(env:item,ass:items) :-
25    hasBody(env,bitm,b),
26    hasHeaderTo(env,toitm,to),
27    hasHeaderAction(env,acitm,ac),
```

APPENDIX E-continued

Exemplary Generated TulaFale script

```
28    hasHeaderMessageId(env,iditm,id),
29    hasHeaderCreated(env,critm,cr),
30    to = "httpserviceasmx",
31    ac = "httppremium",
32    ass = ["Alice" "BobsPetshop" b to ac id cr].
33
34 predicate mkChanEnvelope(env:item,id:item,b:item,newenv:item) :-
35    hasHeaderTo(env,toitm,to),
36    hasHeaderAction(env,acitm,ac),
37    to = "httpserviceasmx",
38    ac = "httppremium",
39    hasNewMessageId(env,id,outenv),
40    swapBody(outenv,b,newenv).
41
42 predicate getChanAssert(env:item,ass:items) :-
 1    hasBody(env,bitm,b),
 2    hasHeaderFrom(env,fromitm,from),
 3    hasHeaderMessageId(env,iditm,id),
 4    hasHeaderRelatesTo(env,riditm,rid),
 5    hasHeaderCreated(env,critm,cr),
 6    from = "httpserviceasmx",
 7    ass = ["Alice" "BobsPetshop" b from rid id cr].
 8
 9 predicate mkChanEnvelope(env:item,id:item,b:item,newenv:item) :-
10    hasHeaderFrom(env,fromitm,from),
11    from = "httpserviceasmx",
12    hasNewMessageId(env,id,newenv).
13
14 channel initChan, httpChan.
15 correspondence Log.
16 private channel B.
17 secret B.
18 private channel dbChan.
19
20 new sr;
21 let kr = pk(sr) in
22 let r = principal(sr) in
23  ((out(publishChan,(r,kr))) |
24    (genX( )) | (genLeakX( )) |
25    (genUP( )) | (genLeakUP( )) |
26
27    (!in (initChan,env);
28       new freshid;
29       filter mkChanEnvelope (env,freshid,B,cenv) -> cenv in
30       new fresh1;
31       new fresh2;
32       let fresh = [fresh1 fresh2] in
33       in (dbChan,ident1);
34       in (dbChan,ident2);
35       let idents = [ident1 ident2] in
36       filter hasSendPolMap(cenv,idents,fresh,outenv) -> outenv in
37       filter getChanAssert(cenv,ass) -> ass in
38       begin (Log,(ass));
39       out (httpChan, outenv)) |
40
41    (!in (httpChan,env);
42       in (dbChan,ident1);
 1       in (dbChan,ident2);
 2       let idents = [ident1 ident2] in
 3       filter hasReceivePolMap(env,idents,tokens) -> tokens in
 4       filter getChanAssert(env,ass) -> ass in
 5       end (Log,(ass));
 6       done))
```

The invention claimed is:

1. A computer-implemented method comprising:

describing one or more links between one or more endpoints with an abstract link description such that, for each link of the one or more links, one or more security goals associated with exchange of message(s) between the one or more endpoints associated with the link are described, the one or more endpoints hosting respective principals networked in a distributed operating environment;

automatically generating, from the abstract link description, detailed security policies for enforcement during exchange of messages between the one or more endpoints; and in response to a request for a communication between a first endpoint of the one or more endpoints and a second endpoint of the one or more endpoints, the first endpoint and the second endpoint being Simple Object Access Protocol (SOAP) processors:

automatically generating a model from the detailed security policies, automatically evaluating the model to determine whether the detailed security policies are secure in a distributed operating environment, allowing the communication when the detailed security policies are secure in the distributed operating environment, and denying the communication and outputting a counterexample when the detailed security policies are not secure in the distributed operating environment.

2. A computer-implemented method as recited in claim 1, where the detailed security policies are specified in configuration data for the one or more endpoints.

3. A computer implemented method as recited in claim 1, wherein a link of the links indicates one or more of a URI of a web service, a set of allowed actions, a set of name(s) of endpoints that can act as client(s) or as web service(s), and a set of secrecy level(s) of one or more messages exchanged between endpoints in one or more sessions.

4. A computer-implemented method as recited in claim 1, wherein the endpoints comprise a client and a server.

5. A computer-implemented method as recited in claim 1, wherein the abstract link description is fixed, randomly generated, or hand written.

6. A computer-implemented method as recited in claim 1, wherein the abstract link description describes one or more of the following: message authentication, confidentiality, anonymity, correlation of request and reply, trust relationship between principals, protection against replayed messages, intended authentication mechanism, and composition of links to form a high-level application configuration.

7. A computer-implemented method as recited in claim 1, wherein the security goals comprise an indication that one or more messages for exchange between the one or more endpoints are signed, encrypted, or have one or more associated signatures that in combination authenticate one or more respective principals.

8. A computer-implemented method as recited in claim 1, wherein an authenticity goal of the security goals indicates that a service principal only accept a request message sent by a client principal or that a client principal only accept a response message from a service principal.

9. A computer-implemented method as recited in claim 1, wherein a secrecy goal of the security goals indicates that a part of messages associated with a link of the links is to be kept secret from any principal that does not participate in the link.

10. A computer-implemented method as recited in claim 1, wherein the detailed security policies comprises non-automatically generated security policies and automatically generated security policies.

11. A computer-implemented method as recited in claim 1, wherein the detailed security policies indicate one or more of the following: a trust relationship between endpoints, a service supported by an endpoint of the one or more endpoints, an action supported by an endpoint of the one or more endpoints.

12. A computer-implemented method as recited in claim 1, wherein at least a subset of the detailed security policies for an endpoint of the one or more endpoints indicates configuration of a server for one or more services and actions, the configuration comprising one or more of a receive request policy and a send response policy.

13. A computer-implemented method as recited in claim 1, wherein at least a subset of the detailed security policies for an endpoint of the one or more endpoints indicates configuration of a client for one or more service or action, the configuration comprising one or more of a send request policy and a receive response policy.

14. A computer-implemented method as recited in claim 1, wherein automatically generating the detailed security policies further comprises selecting cryptographic algorithms for security policy configurations.

15. A computer-implemented method as recited in claim 1, wherein automatically generating further comprises inserting one or more hints into the detailed security policies to assist a theorem proving or type checking operation.

16. A computer-implemented method as recited in claim 1, and further comprising:

evaluating the model to determine if the detailed security policies meet a security goal of the abstract link description.

17. A computer-implemented method as recited in claim 1, wherein the detailed security policies are associated with original security goals, wherein the detailed security policies have been edited to generate modified detailed security policies, and wherein the method further comprises:

generating a model from the modified detailed security policies; and checking the model to determine if the original security goals are maintained in view of the modified detailed security policies.

18. A computer storage medium comprising computer program instructions executable by a processor for:

describing one or more links between one or more endpoints with an abstract link description such that, for each link of the one or more links, one or more security goals associated with exchange of message(s) between the one or more endpoints associated with the link are described, the one or more endpoints hosting respective principals networked in a distributed operating environment;

automatically generating, from the abstract link description, detailed security policies for enforcement during exchange of messages between the one or more endpoints; and in response to a request for a communication between a first endpoint of the one or more endpoints and a second endpoint of the one or more endpoints, the first endpoint and the second endpoint being Simple Object Access Protocol (SOAP) processors:

automatically generating a model from the detailed security policies, automatically evaluating the model to determine whether the detailed security policies are secure in a distributed operating environment, allowing the communication when the detailed security policies are secure in the distributed operating environment, and denying the communication and outputting a counterexample when the detailed security policies are not secure in the distributed operating environment.

* * * * *